US006935658B2

(12) United States Patent
Chernoff et al.

(10) Patent No.: US 6,935,658 B2
(45) Date of Patent: Aug. 30, 2005

(54) CHASSIS FRAME MODULE AND METHOD OF USE FOR SAME

(75) Inventors: Adrian B. Chernoff, Royal Oak, MI (US); Tommy E. White, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 166 days.

(21) Appl. No.: 10/272,434

(22) Filed: Oct. 15, 2002

(65) Prior Publication Data

US 2004/0069556 A1 Apr. 15, 2004

(51) Int. Cl.[7] .............................................. B62D 24/00
(52) U.S. Cl. .................. 280/781; 280/790; 296/187.01
(58) Field of Search ................................ 280/781, 783, 280/790, 785, 797; 296/203.01, 204, 205, 187.01

(56) References Cited

U.S. PATENT DOCUMENTS

| 2,303,286 A | 11/1942 | Lake |
| 2,927,817 A | 3/1960 | Raup ........................... 296/35 |
| 3,722,948 A | 3/1973 | Walsh et al. |
| 4,165,794 A | 8/1979 | Warner et al. |
| 4,189,864 A | 2/1980 | Saito ........................... 46/202 |
| 4,216,839 A | 8/1980 | Gould et al. |
| 4,363,999 A | 12/1982 | Preikschat |
| 4,422,685 A | 12/1983 | Bonfilio et al. ............. 296/197 |
| 4,489,977 A | 12/1984 | Earing, Jr. |
| 4,842,326 A | 6/1989 | diVito ........................ 296/196 |
| 5,058,016 A | 10/1991 | Davidovitch |
| 5,193,635 A | 3/1993 | Mizuno et al. ............. 180/65.3 |
| 5,352,011 A | 10/1994 | Kihara et al. |
| 5,366,281 A | 11/1994 | Littlejohn ...................... 303/3 |
| 5,409,283 A | 4/1995 | Ban |
| 5,418,437 A | 5/1995 | Couture et al. |

(Continued)

FOREIGN PATENT DOCUMENTS

| EP | 0274993 | 11/1987 |
| GB | 2060514 | 5/1981 |

OTHER PUBLICATIONS

Stuart Birch, "Stick or Non–Stick," Automotive Engineering International On Line, Mar. 2000.
Sanket Amberkar, et al., "A System–Safety Process for by–Wire Automotive Systems", SAE Technical Paper, 2000–01–1056, SAE World Congress, Detroit, MI, Mar. 2000.
Edmunds.Com Editors, "Why Drive–by Wire?", The New York Times, Nov. 29, 2000.

*Primary Examiner*—Eric Culbreth
(74) *Attorney, Agent, or Firm*—Kathryn A. Marra

(57) ABSTRACT

A structural frame for a vehicle chassis includes transversely-oriented unitary structural members interconnecting at least three longitudinally-oriented elongated members. The use of unitary structural members and elongated members provides flexibility in assembling structural frames of differing configurations. Correspondingly, a method of assembling structural frames having transversely-oriented unitary structural members interconnecting at least three longitudinally-oriented elongated members is provided.

9 Claims, 29 Drawing Sheets

U.S. PATENT DOCUMENTS

| | | | |
|---|---|---|---|
| 5,534,848 A | 7/1996 | Steele et al. | 340/517 |
| 5,606,503 A | 2/1997 | Shal et al. | 364/423.098 |
| 5,609,353 A | 3/1997 | Watson | 280/707 |
| 5,641,031 A | 6/1997 | Riemer et al. | 180/65.3 |
| 5,660,428 A | 8/1997 | Catlin | 296/205 |
| 5,725,350 A | 3/1998 | Christenson | 414/491 |
| 5,813,487 A | 9/1998 | Lee et al. | 180/65.1 |
| 5,823,636 A | 10/1998 | Parker et al. | 303/3 |
| 6,059,058 A | 5/2000 | Dower | 180/65.3 |
| 6,097,286 A | 8/2000 | Discenzo | |
| 6,102,151 A | 8/2000 | Shimizu et al. | |
| 6,176,341 B1 | 1/2001 | Ansari | 180/402 |
| 6,195,999 B1 | 3/2001 | Arnold et al. | 60/649 |
| 6,208,923 B1 | 3/2001 | Hommel | 701/42 |
| 6,219,604 B1 | 4/2001 | Dilger et al. | 701/41 |
| 6,223,843 B1 | 5/2001 | O'Connell et al. | 180/65.3 |
| 6,305,758 B1 | 10/2001 | Hageman et al. | 303/115.2 |
| 6,318,494 B1 | 11/2001 | Pattok | 180/402 |
| 6,321,145 B1 | 11/2001 | Rajashekara | 701/22 |
| 6,322,105 B1 * | 11/2001 | Na | 280/781 |
| 6,370,460 B1 | 4/2002 | Kaufmann et al. | 701/41 |
| 6,378,637 B1 | 4/2002 | Ono et al. | 180/65.3 |
| 6,390,565 B2 | 5/2002 | Riddiford et al. | 303/3 |
| 6,394,207 B1 | 5/2002 | Skala | 180/65.2 |
| 6,394,218 B1 | 5/2002 | Heitzer | 180/402 |
| 6,394,537 B1 | 5/2002 | DeRees | |
| 6,397,134 B1 | 5/2002 | Shal et al. | 701/37 |
| 6,408,966 B1 | 6/2002 | Benz et al. | |
| 6,424,900 B2 | 7/2002 | Murray et al. | |
| 6,435,584 B1 | 8/2002 | Bonnville | |
| 6,488,345 B1 | 12/2002 | Woody et al. | |
| 2001/0029408 A1 | 10/2001 | Murray et al. | |

\* cited by examiner

CHASSIS FRAME MODULE AND METHOD OF USE FOR SAME

TECHNICAL FIELD

This invention relates to vehicle chassis frames that employ modular frame components.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical, and structural components that, in combination with a body, comprise a fully functional vehicle. The nature of the prior art connections between a vehicle body and vehicular componentry may result in certain inefficiencies in the design, manufacture, and use of vehicles. Three characteristics of prior art body connections that significantly contribute to these inefficiencies are the quantity of connections; the mechanical nature of many of the connections; and the locations of the connections on the body and on the componentry.

In the prior art, the connections between a body and componentry are numerous. Each connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electrical energy to the body from electricity-generating components and to transmit data from sensors that monitor the status of the componentry; mechanical control linkages, such as the steering column, throttle cable, and transmission selector; and ductwork and hoses to convey fluids such as heated and cooled air from an HVAC unit to the body for the comfort of passengers.

Many of the connections in the prior art, particularly those connections that transmit control signals, are mechanical linkages. For example, to control the direction of the vehicle, a driver sends control signals to the steering system via a steering column. Mechanical linkages result in inefficiencies, in part, because different driver locations in different vehicles require different mechanical linkage dimensions and packaging. Thus, new or different bodies often cannot use "off-the-shelf" components and linkages. Componentry for one vehicle body configuration is typically not compatible for use with other vehicle body configurations. Furthermore, if a manufacturer changes the design of a body, a change in the design of the mechanical linkage and the component to which it is attached may be required. The change in design of the linkages and components requires modifications to the tooling that produces the linkages and components.

The location of the connections on prior art vehicle bodies and componentry also results in inefficiencies. In prior art body-on-frame architecture, connection locations on the body are often not exposed to an exterior face of the body, and are distant from corresponding connections on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

Furthermore, prior art vehicles typically have internal combustion engines that have a height that is a significant proportion of the overall vehicle height. Prior art vehicle bodies are therefore designed with an engine compartment that occupies about a third of the front (or sometimes the rear) of the body length. Compatibility between an engine and a vehicle body requires that the engine fit within the body's engine compartment without physical part interference. Moreover, compatibility between a prior art chassis with an internal combustion engine and a vehicle body requires that the body have an engine compartment located such that physical part interference is avoided. For example, a vehicle body with an engine compartment in the rear is not compatible with a chassis with an engine in the front.

Furthermore, prior art vehicle structural componentry does not provide for significant manufacturing flexibility. For example, in prior art body-frame-integral vehicles, the length of the structural componentry cannot readily be varied from one vehicle to another on an assembly line without prohibitively extensive retooling and validation.

SUMMARY OF THE INVENTION

A self-contained chassis has substantially all of the mechanical, electrical, and structural componentry necessary for a fully functional vehicle, including at least a structural frame, an energy conversion system, a suspension and wheels, a steering system, and a braking system. The chassis has a simplified, and preferably standardized, interface with connection components to which bodies of substantially varying design can be attached. Systems responsive to non-mechanical control signals eliminate the need for mechanical control linkages.

The structural frame includes at least three generally longitudinally-oriented elongated members and a transversely-oriented chassis frame module, also referred to as a "unitary structural member." At least one of the elongated members is spaced a vertical distance from the other elongated members. The unitary structural member extends transversely and vertically between the at least three elongated members, and is attached to, and thereby interconnects, the at least three elongated members.

The use of longitudinally-oriented elongated members and transversely-oriented unitary structural members provides frame assemblers with a high degree of flexibility in assembling chassis frames of differing lengths. Correspondingly, a method of advantageously employing unitary structural members is provided.

The method includes maintaining a first inventory of elongated members of various lengths and a second inventory of unitary structural members configured to at least partially define a structural frame with at least three of the elongated members. The method further includes assembling a first vehicle chassis structural frame having a first configuration.

The first chassis structural frame has a first selection of at least three elongated members selected from the first inventory and oriented generally longitudinally. The first selection contains a first quantity of elongated members. At least one of the elongated members of the first selection is vertically spaced from the other elongated members of the first selection, and at least one of the elongated members is transversely spaced from the other elongated members of the first selection. The first chassis structural frame also has a first set of at least two unitary structural members selected from the second inventory. The at least two unitary structural members of the first set are oriented transversely, spaced a first distance apart from one another, and attached to, and thereby interconnect, the first selection of elongated members to further define the first structural frame.

The method also includes assembling a second vehicle chassis structural frame having a second configuration. The second chassis structural frame has a second selection of at least three elongated members selected from the first inventory and oriented generally longitudinally. The second selection has a second quantity of elongated members. At least one of the elongated members of the second selection is vertically spaced from the other elongated members of the second selection, and at least one of the elongated members of the second selection is transversely spaced from the other elongated members of the second selection.

The second chassis structural frame also has a second set of at least two unitary structural members selected from the second inventory. The at least two unitary structural members of the second set are oriented transversely, spaced a second distance apart, and attached to, and thereby interconnect, the second selection of elongated members to further define the second structural frame. The elongated members of the second selection are sufficiently differently dimensioned from the elongated members of the first selection, or the first quantity of elongated members differs from the second quantity of elongated members, such that the second configuration is differently-dimensioned from the first configuration.

The above objects, features, aspects, and advantages, and other objects features, aspects, and advantages, of the present invention are readily apparent from the following detailed description of the best mode for carrying out the invention when taken in connection with the accompanying drawings.

DETAILED DESCRIPTION OF THE PREFERRED EMBODIMENT

Figure 1:
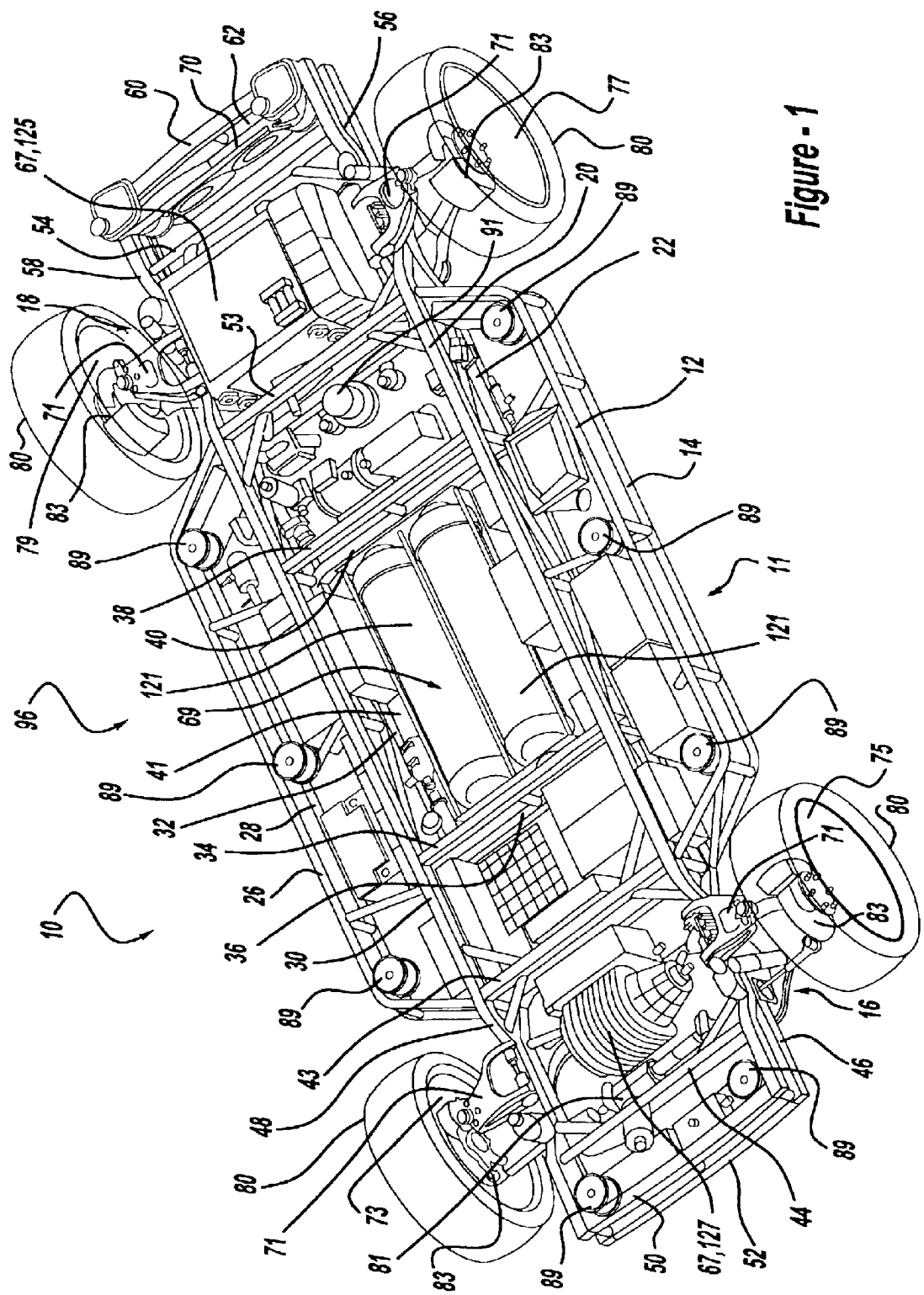
FIG. 1 is a schematic illustration in perspective view of a vehicle rolling platform.

Referring to FIG. 1, a vehicle chassis 10, also referred to as the "rolling platform," includes a structural frame 11. The structural frame 11 depicted in FIG. 1 comprises a series of interconnected structural elements including upper and lower side structural elements 12 and 14 that comprise a "sandwich"-like construction. Elements 12 and 14 are substantially rigid tubular (or optionally solid), members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements 26, 28, 30 and 32 extend along the right side thereof.

Lateral structural elements 34, 36 extend between elements 20, 30 and 22, 32, respectively nearer the front axle area 16 and lateral structural elements 38, 40 extend between elements 20, 30 and 22, 32, respectively nearer the rear axle area 18, thereby defining a mid-chassis space 41. The front axle area 16 is defined in and around structural elements 43, 44 at the rear and front, and on the sides by structural elements 46, 48 which may be extensions of the elements 20, 22, 30, 32 or connected therewith. Forward of the front axle area, a forward space is defined between element 44 and elements 50, 52. The rear axle area 18 is defined in and around structural elements 53, 54 at the front and rear, and on the sides by structural elements 56, 58, which may be extensions of the elements 20, 22, 30, 32 or connected therewith. Rearward of the rear axle area 18, a rearward space is defined between element 54 and elements 60, 62. Alternatively, the rear axle area 18 or the rearward space may be elevated relative to the rest of the structural frame 11 if necessary to accommodate an energy conversion system, and the frame may include other elements to surround and protect an energy conversion system. The frame defines a plurality of open spaces between the elements described above. Those skilled in the art will recognize materials and fastening methods suitable for use in the structural frame. For example, the structural elements may be tubular, aluminum, and welded at their respective connections to other structural elements.

Figure 2:
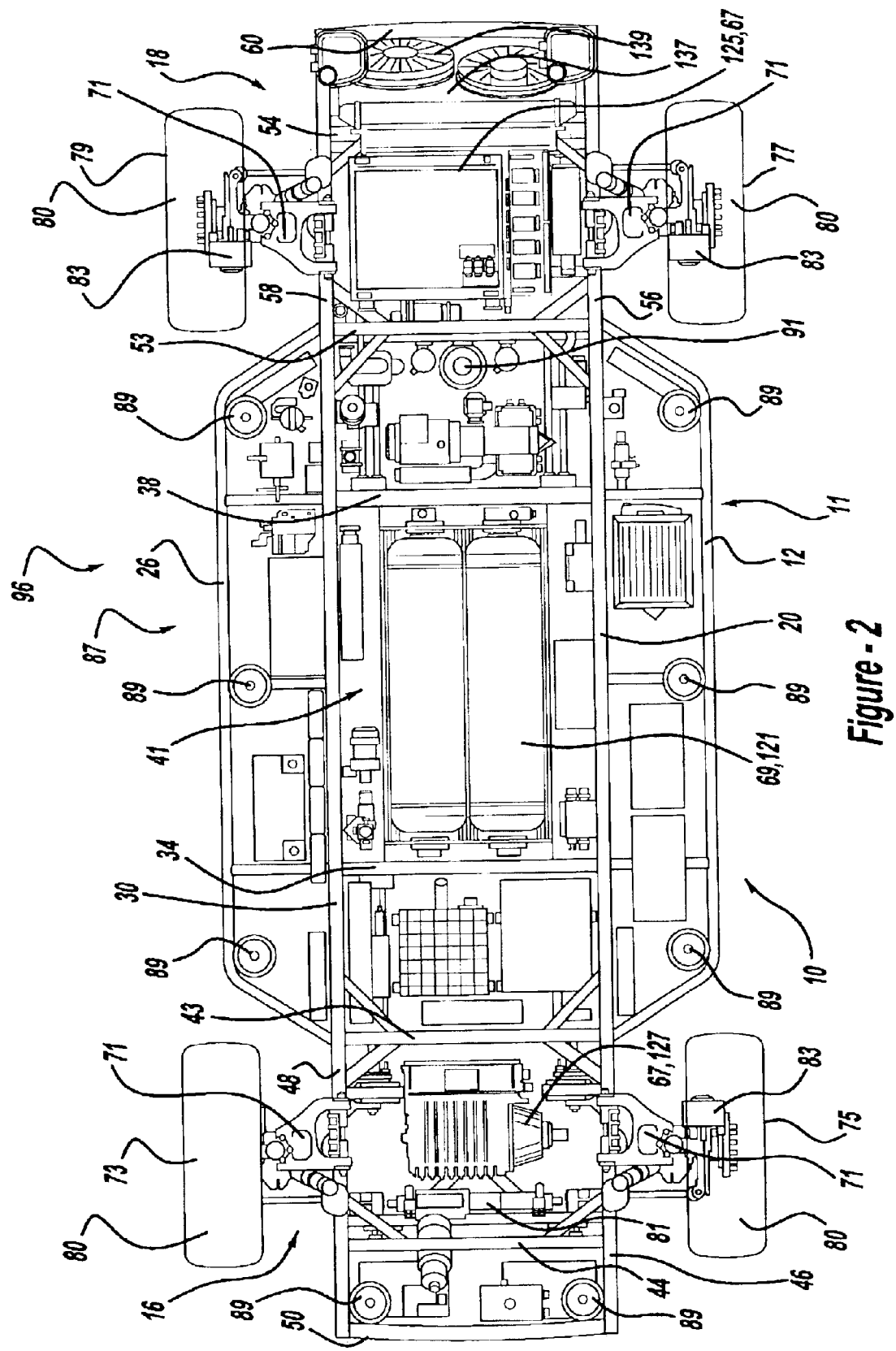
FIG. 2 is a top view schematic illustration of the vehicle rolling platform shown in FIG. 1.
Figure 3:
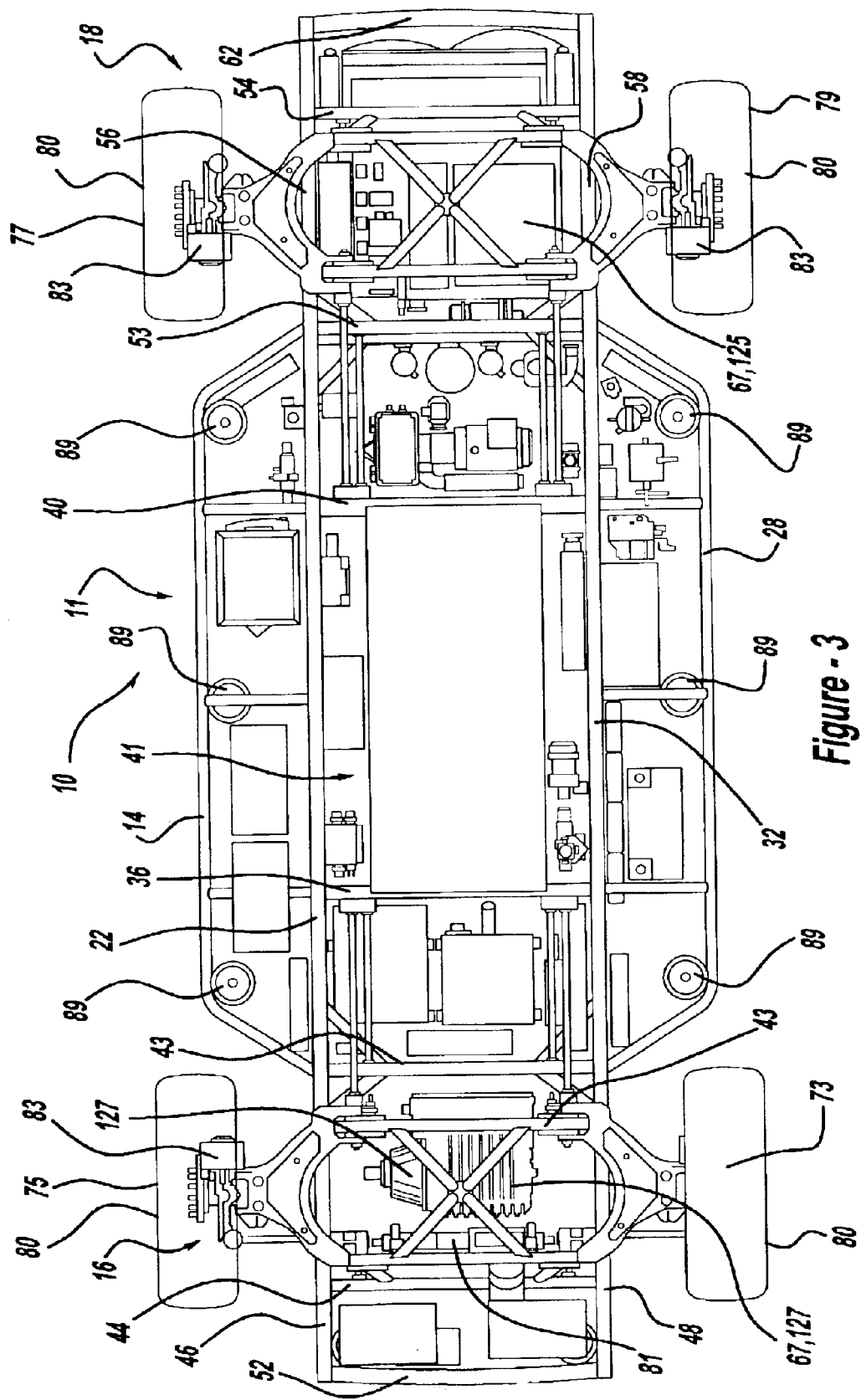
FIG. 3 is a bottom view schematic illustration of the vehicle rolling platform shown in FIGS. 1 and 2.
Figure 4:
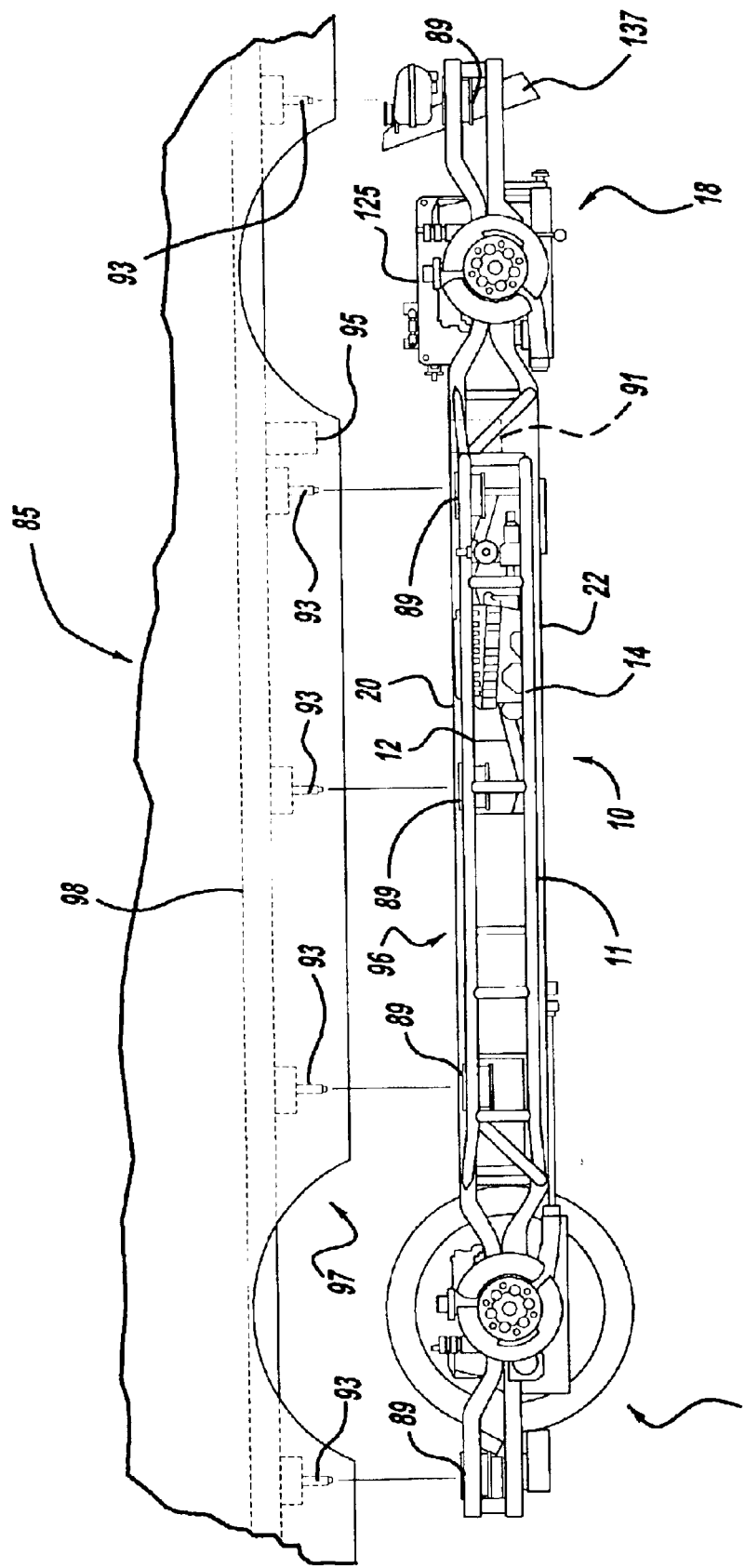
FIG. 4 is a schematic illustration in side view of a vehicle body pod and rolling platform attachment scenario that is useful with the embodiments of FIGS. 1–3.

The structural frame 11 provides a rigid structure to which an energy conversion system 67, energy storage system 69, suspension system 71 with wheels 73, 75, 77, 79 (each wheel having a tire 80), steering system 81, and braking system 83 are mounted, as shown in FIGS. 1–3, and is configured to support an attached body 85, as shown in FIG. 4. A person of ordinary skill in the art will recognize that the structural frame 11 can take many different forms, in addition to the cage-like structure of the embodiment depicted in FIGS. 1–3. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components. The structural frame may also be integrated with various chassis components.

Referring to FIG. 2, a body attachment interface 87 is defined as the sum of all body connection components, i.e., connective elements that function to operably mate a vehicle body to the chassis 10. The body connection components of the preferred embodiment include a plurality of load-bearing body-retention couplings 89 mounted with respect to the structural frame 11 and a single electrical connector 91.

As shown in FIG. 4, the load-bearing body-retention couplings 89 are engageable with complementary attachment couplings 93 on a vehicle body 85 and function to physically fasten the vehicle body 85 to the chassis 10. Those skilled in the art will recognize that a multitude of fastening and locking elements may be used and fall within the scope of the claimed invention. The load-bearing body-retention couplings 89 are preferably releasably engageable with complementary couplings, though non-releasably engageable couplings such as weld flanges or riveting surfaces may be employed within the scope of the claimed invention. Ancillary fastening elements may be used as lock downs in conjunction with the load-bearing body-retention couplings. Load-bearing surfaces without locking or fastening features on the chassis 10 may be used with the load-bearing body-retention couplings 89 to support the weight of an attached vehicle body 85. In the preferred embodiment, the load-bearing body-retention couplings 89 include support brackets with bolt holes. Rubber mounts (not shown) located on the support brackets dampen vibrations transmitted between the body and the chassis. Alternatively, hard mounts may be employed for body-retention couplings.

The electrical connector 91 is engageable with a complementary electrical connector 95 on a vehicle body 85. The electrical connector 91 of the preferred embodiment may perform multiple functions, or select combinations thereof. First, the electrical connector 91 may function as an electrical power connector, i.e., it may be configured to transfer electrical energy generated by components on the chassis 10 to a vehicle body 85 or other non-chassis destination. Second, the electrical connector 91 may function as a control signal receiver, i.e., a device configured to transfer non-mechanical control signals from a non-chassis source to controlled systems including the energy conversion system, steering system, and braking system. Third, the electrical connector 91 may function as a feedback signal conduit through which feedback signals are made available to a vehicle driver. Fourth, the electrical connector 91 may function as an external programming interface through which software containing algorithms and data may be transmitted for use by controlled systems. Fifth, the electrical connector may function as an information conduit through which sensor information and other information is made available to a vehicle driver. The electrical connector 91 may thus function as a communications and power "umbilical" port through which all communications between the chassis 10 and an attached vehicle body 85 are transmitted. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

If one electrical connector performing multiple functions is not desirable, for example, if a cumbersome wire bundle is required, or power transmission results in control signal interference, the body attachment interface 87 may include a plurality of electrical connectors 91 engageable with a plurality of complementary electrical connectors 95 on a vehicle body 85, with different connectors performing different functions. A complementary electrical connector 95 performs functions complementary to the function of the electrical connector with which it engages, for example, functioning as a control signal transmitter when engaged with a control signal receiver.

Referring again to FIGS. 1–3, the energy conversion system 67, energy storage system 69, steering system 81, and braking system 83, are configured and positioned on the chassis 10 to minimize the overall vertical height of the chassis 10 and to maintain a substantially horizontal upper chassis face 96. A face of an object is an imaginary surface that follows the contours of the object that face, and are directly exposed to, a particular direction. Thus, the upper chassis face 96 is an imaginary surface that follows the upwardly facing and exposed contours of the chassis frame 11 and systems mounted therein. Matable vehicle bodies have a corresponding lower body face 97 that is an imaginary surface that follows the downwardly facing and exposed contours of the body 85, as shown in FIG. 4.

Referring again to FIGS. 1–3, the structural frame 11 has a thickness defined as the vertical distance between its highest point (the top of structural element 20) and its lowest point (the bottom of structural element 22). In the preferred embodiment, the structural frame thickness is approximately 11 inches. To achieve a substantially horizontal upper chassis face 96, the energy conversion system 67, energy storage system 69, steering system 81, and braking system 83 are distributed throughout the open spaces and are configured, positioned, and mounted to the structural frame 11 such that the highest point of any of the energy conversion system 67, energy storage system 69, steering system 81, and braking system 83 does not extend or protrude higher than the highest point of the structural frame 11 by an amount more than 50% of the structural frame thickness. Alternatively, the highest point of any of the energy conversion system 67, energy storage system 69, steering system 81, and braking system 83 does not extend or protrude higher than the top of any of the tires 80. Alternatively, the highest point of any of the energy conversion system 67, energy storage system 69, steering system 81, and braking system 83 does not extend or protrude higher than the top of any of the wheels 73, 75, 77, 79. In the context of the present invention, a tire is not considered part of a wheel. A wheel typically comprises a rim and a wheel disc or nave that connects the rim to a wheel hub, and does not include a mounted tire. A tire is mounted around the periphery of a wheel. The substantially horizontal upper chassis face 96 enables the attached vehicle body 85 to have a passenger area that extends the length of the chassis, unlike prior art bodies that have an engine compartment to accommodate a vertically-protruding internal combustion engine.

Most of the powertrain load is evenly distributed between the front and rear of the chassis so there is a lower center of gravity for the whole vehicle without sacrificing ground clearance, thereby enabling improved handling while resisting rollover forces.

Referring again to FIG. 4, the preferred embodiment of the rolling platform 10 is configured such that the lower body face 97 of a matable vehicle body 85 is positioned closely adjacent to the upper chassis face 96 for engagement with the rolling platform 10. The body connection components have a predetermined spatial relationship relative to one another, and are sufficiently positioned, exposed, and unobstructed such that when a vehicle body 85 having complementary connection components (complementary attachment couplings 93 and a complementary electrical connector 95) in the same predetermined spatial relationship as the body connection components is sufficiently positioned relative to the upper chassis face 96 of a chassis 10, the complementary connection components are adjacent to corresponding body connection components and ready for engagement, as depicted in FIG. 4. In the context of the present invention, a body connection component having a protective covering is exposed and unobstructed if the protective covering is removable or retractable.

Figure 5:
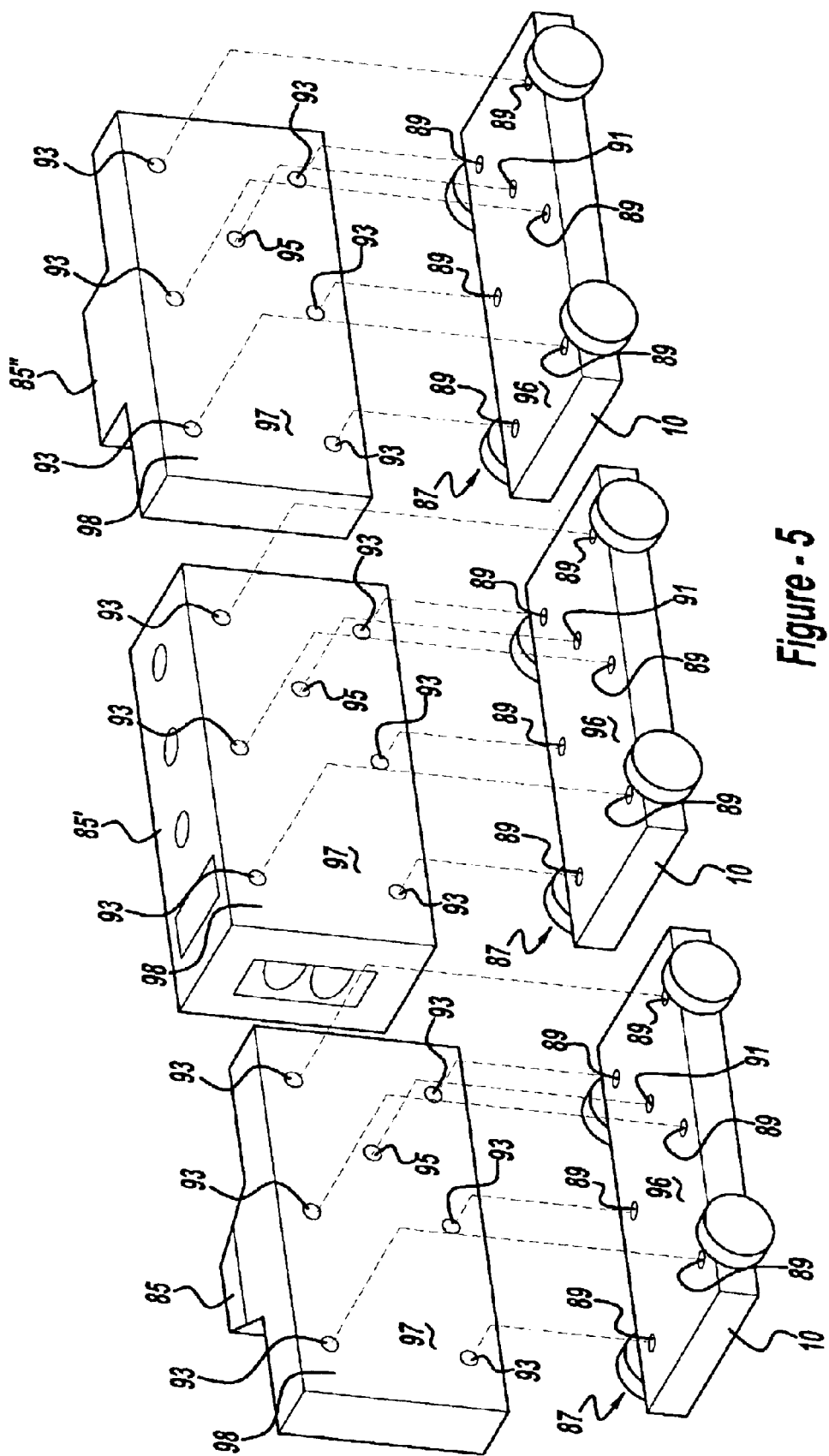
FIG. 5 is a schematic illustration of a vehicle body pod and rolling platform attachment scenario, wherein body pods of differing configurations are each attachable to identical rolling platforms.

Each body connection component has a spatial relationship relative to each of the other body connection components that can be expressed, for example, as a vector quantity. Body connection components and complementary connection components have the same predetermined spatial relationship if the vector quantities that describe the spatial relationship between a body connection component and the other body connection components to be engaged also describe the spatial relationship between a corresponding complementary connection component and the other complementary connection components to be engaged. For example, the spatial relationship may be defined as follows: a first body connection component is spaced a distance $Ax+By$ from a reference point; a second body connection component is spaced a distance $Cx+Dy$ from the reference point; a third body connection component is spaced a distance $Ex+Fy$ from the reference point, etc. Corresponding complementary connection components in the same predetermined spatial relationship are spaced in a mirror image relationship in the lower body face, as depicted in FIGS. 4 and 5. A protective covering (not shown) may be employed to protect any of the body connection components.

The body connection components and the complementary connection components are preferably adjacent without positional modification when a vehicle body 85 is sufficiently positioned relative to a chassis 10; however, in the context of the present invention, the body connection components may be movable relative to each other within a predetermined spatial relationship to accommodate build tolerances or other assembly issues. For example, an electrical connector may be positioned and operably connected to a signal-carrying cable. The cable may be fixed relative to the structural frame at a point six inches from the electrical connector. The electrical connector will thus be movable within six inches of the fixed point on the cable. A body connection component is considered adjacent to a complementary connection component if one or both are movable within a predetermined spatial relationship so as to be in contact with each other.

Referring to FIG. 5, the body-attachment interface enables compatibility between the chassis 10 and different types of bodies 85, 85', 85" having substantially different designs. Bodies 85, 85', 85" having a common base 98 with complementary attachment couplings 93 and complementary electrical connectors 95 in the same predetermined spatial relationship with one another as the predetermined spatial relationship between body connection components on the body-attachment interface 87, are each matable with the chassis 10 by positioning the body 85, 85', 85" relative to the chassis 10 such that each complementary attachment coupling 93 is adjacent to a load-bearing body-retention coupling 89, and the complementary electrical connector 95 is adjacent to the electrical connector 91. Preferably, all bodies and chassis comply with this common, standardized interface system, thereby facilitating compatibility between a wide array of different body types and styles and a single chassis design. The substantially horizontal upper chassis face 96 also facilitates compatibility between the rolling platform 10 and a multitude of differently-configured body styles. The common base 98 functions as a body structural unit and forms the lower body face 97 in the embodiment depicted. FIG. 5 schematically depicts a pickup truck 85, a van 85', and a sedan 85" each having a common base 98.

The body connection components are preferably sufficiently exposed at a chassis face to facilitate attachment to complementary connection components on a matable vehicle body. Similarly, complementary connection components on a matable vehicle body are sufficiently exposed at a body face to facilitate attachment to body connection components on a vehicle chassis. The body connection components are preferably located at or above the upper chassis face for engagement with complementary connection components located at or below a lower body face.

A connection device may be employed to engage or operably connect a body connection component with a distant complementary connection component, in the situation where a vehicle body does not have complementary connection components in the same predetermined spatial relationship as the body connection components on a vehicle chassis. For example, a cable having two connectors, one connector engageable with the electrical connector on a body attachment interface and the other connector engageable with a complementary connector on a matable vehicle body, may be used to operably connect the electrical connector and the complementary connector.

The bodies 85, 85', 85" shown schematically in FIG. 5 each use all of the body connection components on the vehicle chassis 10. However, within the scope of the claimed invention, a chassis may have more body connection components than are actually mated with a vehicle body. For example, a chassis may have ten load-bearing body-retention couplings, and be matable with a body that engages only five of the ten load-bearing body-retention couplings. Such an arrangement is particularly useful when an attachable body is of a different size than the chassis. For example, a matable body may be smaller than a chassis. Similarly, and within the scope of the claimed invention, a body may be modular such that separate body components are independently connected to the vehicle chassis by the load-bearing body-retention couplings.

A body may have more complementary connection components than are engageable with the body connection components of a particular chassis. Such an arrangement may be employed to enable a particular body to be matable to multiple chassis each having a different predetermined spatial relationship among its body connection components.

The load-bearing body-retention couplings 89 and the electrical connector 91 are preferably releasably engageable without damage to either an attached body 85 or the chassis 10, thereby enabling removal of one body 85 from the chassis 10 and installation of a different body 85', 85" on the chassis 10.

In the preferred embodiment, the body-attachment interface 87 is characterized by the absence of any mechanical control signal-transmission linkages and any couplings for attaching mechanical control signal-transmission linkages. Mechanical control linkages, such as steering columns, limit the compatibility between a chassis and bodies of different configurations.

Referring to FIG. 1, the steering system 81 is housed in the front axle area 16 and is operably connected to the front wheels 73, 75. Preferably, the steering system 81 is responsive to non-mechanical control signals. In the preferred embodiment, the steering system 81 is by-wire. A by-wire system is characterized by control signal transmission in electrical form. In the context of the present invention, "by-wire" systems, or systems that are controllable "by-wire," include systems configured to receive control signals in electronic form via a control signal receiver on the body attachment interface 87, and respond in conformity to the electronic control signals.

Figure 6:
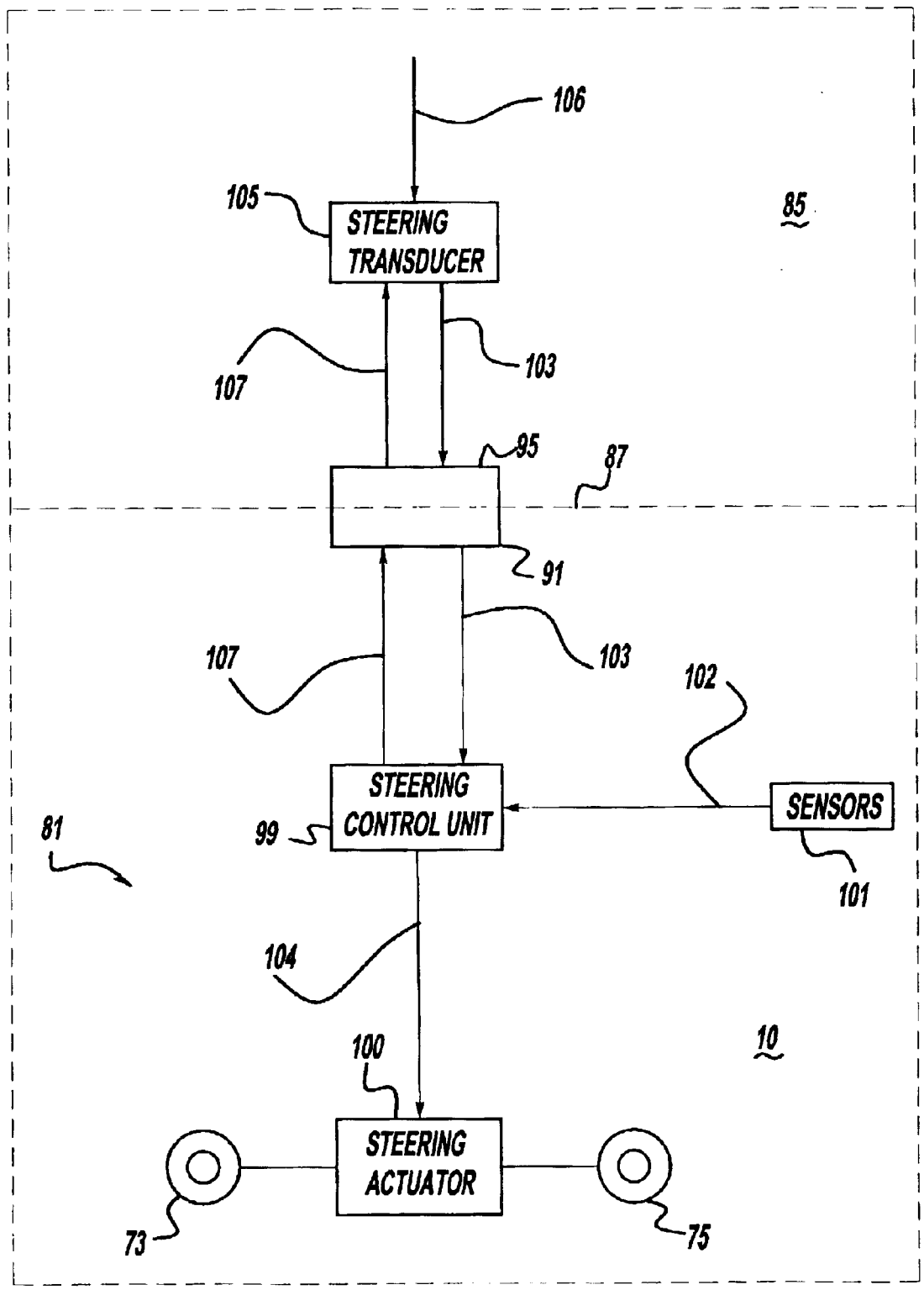
FIG. 6 is a schematic illustration of a steering system for use with the rolling platform and body pod shown in FIG. 4.

Referring to FIG. 6, the by-wire steering system 81 of the preferred embodiment includes a steering control unit 99, and a steering actuator 100. Sensors 101 are located on the chassis 10 and transmit sensor signals 102 carrying information concerning the state or condition of the chassis 10 and its component systems. The sensors 101 may include position sensors, velocity sensors, acceleration sensors, pressure sensors, force and torque sensors, flow meters, temperature sensors, etc. The steering control unit 99 receives and processes sensor signals 102 from the sensors 101 and electrical steering control signals 103 from the electrical connector 91, and generates steering actuator control signals 104 according to a stored algorithm. A control unit typically includes a microprocessor, ROM and RAM and appropriate input and output circuits of a known type for receiving the various input signals and for outputting the various control commands to the actuators. Sensor signals 102 may include yaw rate, lateral acceleration, angular wheel velocity, tie-rod force, steering angle, chassis velocity, etc.

The steering actuator 100 is operably connected to the front wheels 73, 75 and configured to adjust the steering angle of the front wheels 73, 75 in response to the steering actuator control signals 104. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 100 is an electric drive motor configured to adjust a mechanical steering rack.

Referring again to FIG. 6, the preferred embodiment of the chassis 10 is configured such that it is steerable by any source of compatible electrical steering control signals 103 connected to the electrical connector 91. FIG. 6 depicts a steering transducer 105 located on an attached vehicle body 85 and connected to a complementary electrical connector 95. Transducers convert the mechanical control signals of a vehicle driver to non-mechanical control signals. When used with a by-wire system, transducers convert the mechanical control signals to electrical control signals usable by the by-wire system. A vehicle driver inputs control signals in mechanical form by turning a wheel, depressing a pedal, pressing a button, or the like. Transducers utilize sensors, typically position and force sensors, to convert the mechanical input to an electrical signal. In the preferred embodiment, a +/−20 degree slide mechanism is used for driver input, and an optical encoder is used to read input rotation.

The complementary electrical connector 95 is coupled with the electrical connector 91 of the body attachment interface 87. The steering transducer 105 converts vehicle driver-initiated mechanical steering control signals 106 to electrical steering control signals 103 which are transmitted via the electrical connector 91 to the steering control unit 99. In the preferred embodiment, the steering control unit 99 generates steering feedback signals 107 for use by a vehicle driver and transmits the steering feedback signals 107 through the electrical connector 91. Some of the sensors 101 monitor linear distance movement of the steering rack and vehicle speed. This information is processed by the steering control unit 99 according to a stored algorithm to generate the steering feedback signals 107. A torque control motor operably connected to the slide mechanism receives the steering feedback signals 107 and is driven in the opposite direction of the driver's mechanical input.

In the context of the present invention, a "by-wire" system may be an actuator connected directly to an electrical connector in the body attachment interface. An alternative by-wire steering system 81' within the scope of the claimed invention is depicted schematically in FIG. 7, wherein like reference numbers refer to like components from FIG. 6. A steering actuator 100 configured to adjust the steering angle of the front wheels 73, 75 is connected directly to the electrical connector 91. In this embodiment, a steering control unit 99' and a steering transducer 105 may be located in an attached vehicle body 85. The steering transducer 105 would transmit electrical steering control signals 103 to the steering control unit 99', and the steering control unit 99' would transmit steering actuator control signals 104 to the steering actuator 100 via the electrical connector 91. Sensors 101 positioned on the chassis 10 transmit sensor signals 102 to the steering control unit 99' via the electrical connector 91 and the complementary electrical connector 95.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 83 is mounted to the structural frame 11 and is operably connected to the wheels 73, 75, 77, 79. The braking system is configured to be responsive to non-mechanical control signals. In the preferred embodiment, the braking system 83 is by-wire, as depicted schematically in FIG. 8, wherein like reference numbers refer to like components from FIGS. 6 and 7. Sensors 101 transmit sensor signals 102 carrying information concerning the state or condition of the chassis 10 and its component systems to a braking control unit 108. The braking control unit 108 is connected to the electrical connector 91 and is configured to receive electrical braking control signals 109 via the electrical connector 91. The braking control unit 108 processes the sensor signals 102 and the electrical braking control signals 109 and generates braking actuator control signals 110 according to a stored algorithm. The braking control unit 108 then transmits the braking actuator control signals 110 to braking actuators 111, 112, 113, 114 which act to reduce the angular velocity of the wheels 73, 75, 77, 79. Those skilled in the art will recognize the manner in which the braking actuators 111, 112, 113, 114 act on the wheels 73, 75, 77, 79. Typically, actuators cause contact between friction elements, such as pads and disc rotors. Optionally, an electric motor may function as a braking actuator in a regenerative braking system.

The braking control unit 108 may also generate braking feedback signals 115 for use by a vehicle driver and transmit the braking feedback signals 115 through the electrical connector 91. In the preferred embodiment, the braking actuators 111, 112, 113, 114 apply force through a caliper to a rotor at each wheel. Some of the sensors 101 measure the applied force on each caliper. The braking control unit 108 uses this information to ensure synchronous force application to each rotor.

Referring again to FIG. 8, the preferred embodiment of the chassis 10 is configured such that the braking system is responsive to any source of compatible electrical braking control signals 109. A braking transducer 116 may be located on an attached vehicle body 85 and connected to a complementary electrical connector 95 coupled with the electrical connector 91. The braking transducer 116 converts vehicle driver-initiated mechanical braking control signals 117 into electrical form and transmits the electrical braking control signals 109 to the braking control unit via the electrical connector 91. In the preferred embodiment, the braking transducer 116 includes two hand-grip type assemblies. The braking transducer 116 includes sensors that measure both the rate of applied pressure and the amount of applied pressure to the hand-grip assemblies, thereby converting mechanical braking control signals 117 to electrical braking control signals 109. The braking control unit 108 processes both the rate and amount of applied pressure to provide both normal and panic stopping.

Figure 7:
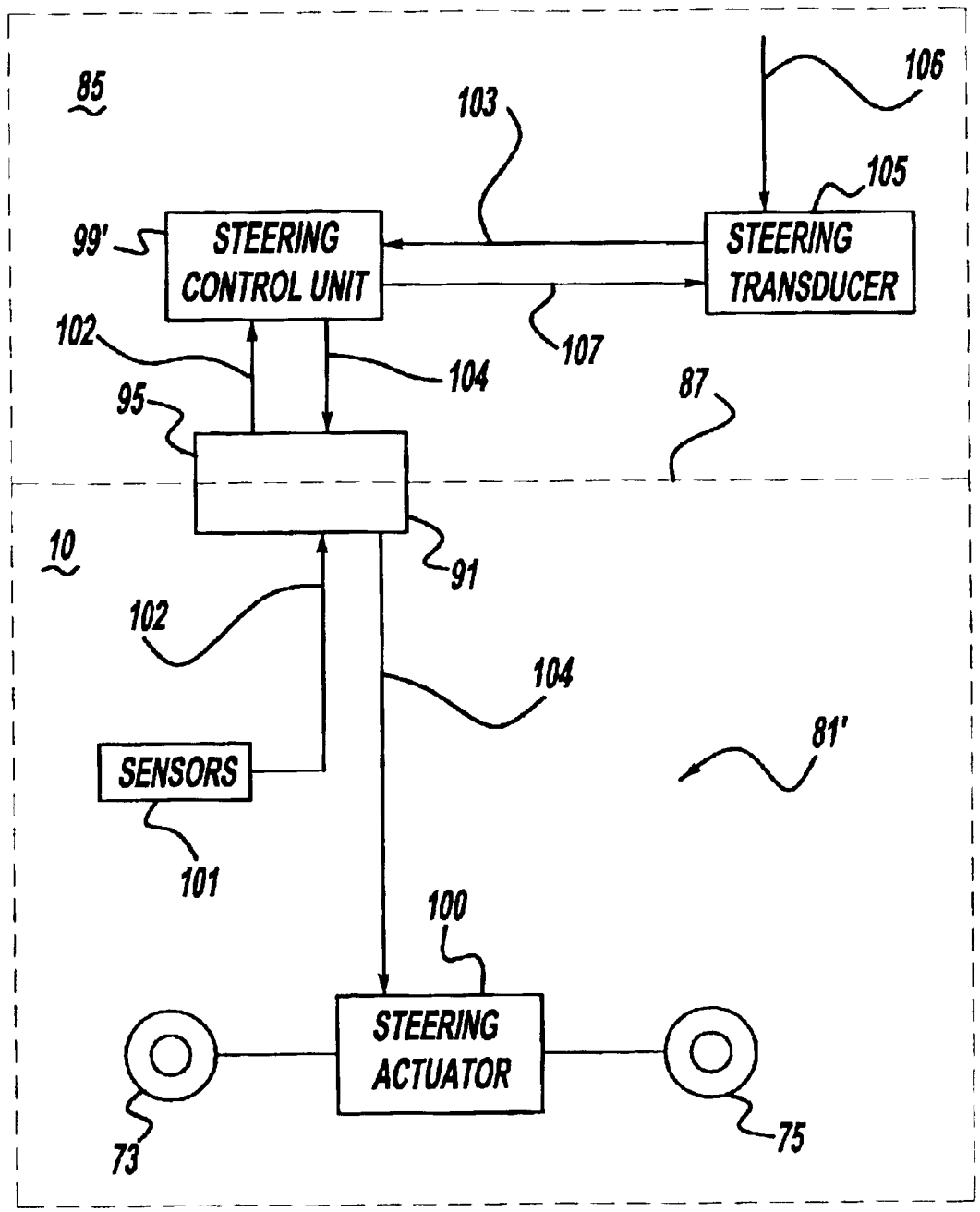
FIG. 7 is a schematic illustration of an alternative steering system for use in the rolling platform and body pod of FIG. 4.
Figure 8:
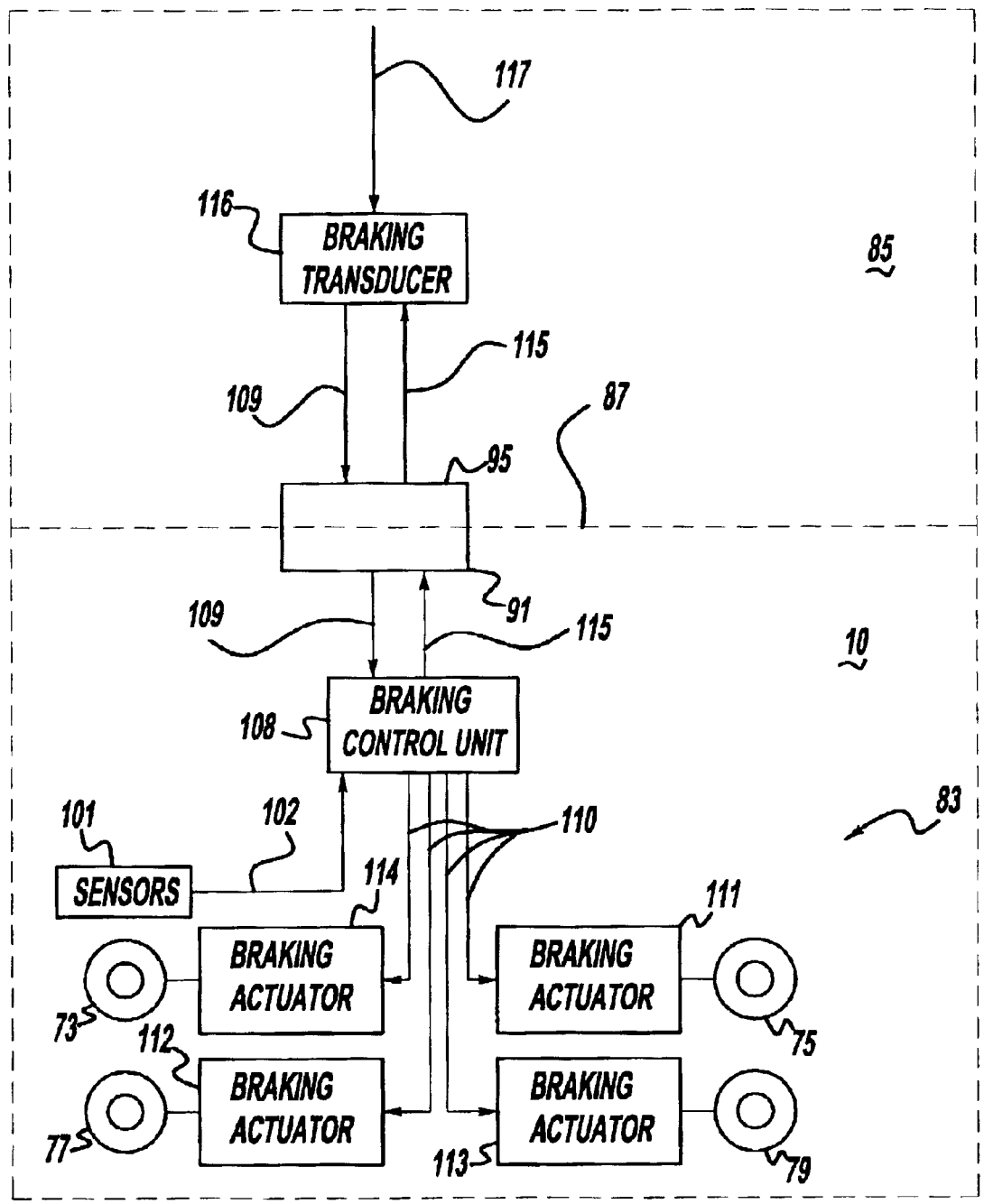
FIG. 8 is a schematic illustration of a braking system for use with the rolling platform and body pod of FIG. 4.
Figure 9:
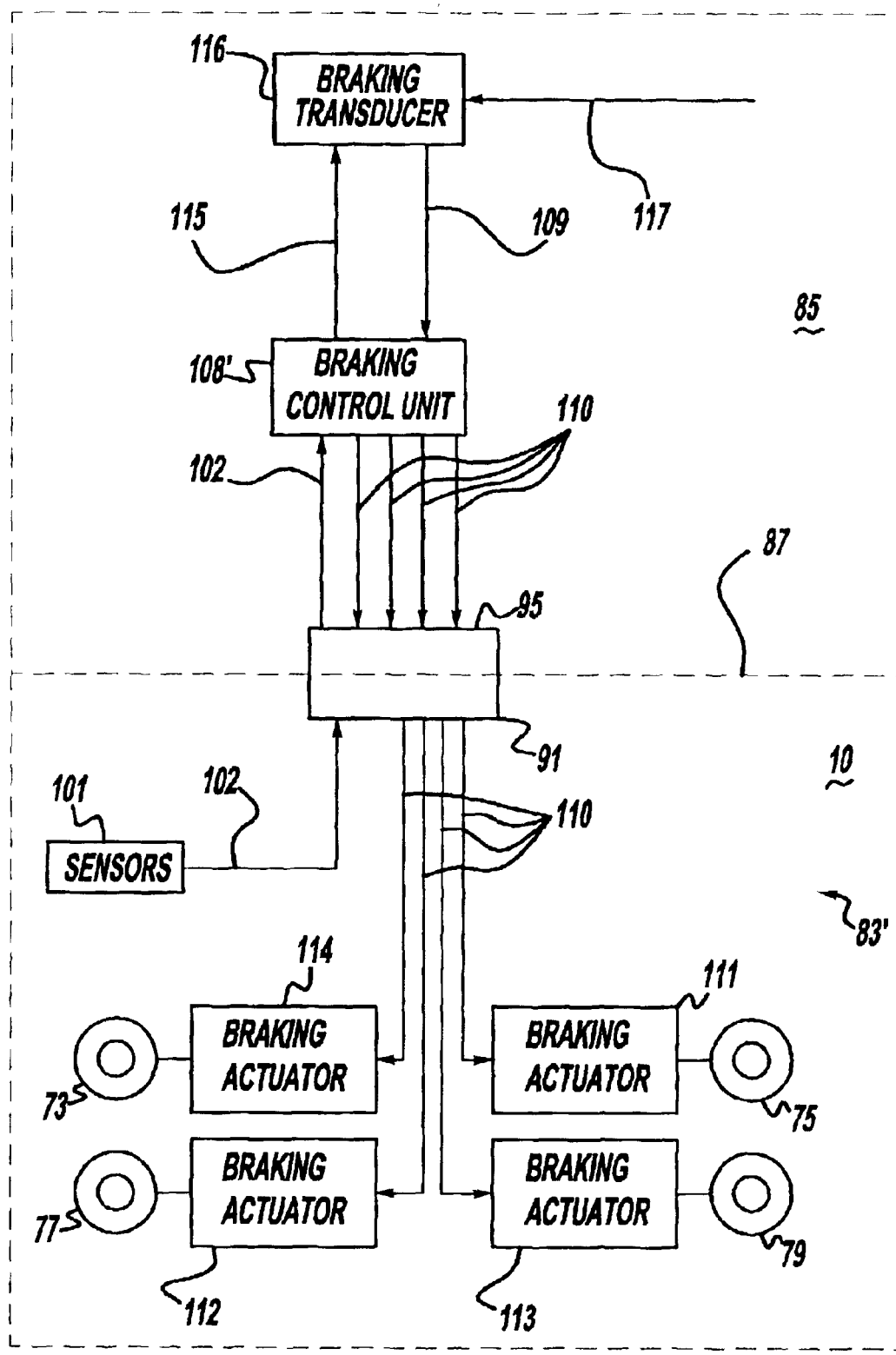
FIG. 9 is a schematic illustration of an alternative braking system for use with the rolling platform and body pod of FIG. 4.

An alternative brake-by-wire system 83' within the scope of the claimed invention is depicted in FIG. 9, wherein like reference numbers refer to like components from FIGS. 6–8. The braking actuators 111, 112, 113, 114 and sensors 101 are connected directly to the electrical connector 91. In this embodiment, a braking control unit 108' may be located in an attached vehicle body 85. A braking transducer 116 transmits electrical braking control signals 109 to the braking control unit 108', and the braking control unit 108' transmits braking actuator signals 109 to the braking actuators 111, 112, 113, 114 via the electrical connector 91.

Examples of brake-by-wire systems are described in U.S. Pat. No. 5,366,281, issued Nov. 22, 2994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Referring again to FIG. 1, the energy storage system 69 stores energy that is used to propel the chassis 10. For most applications, the stored energy will be in chemical form. Examples of energy storage systems 69 include fuel tanks and electric batteries. In the embodiment shown in FIG. 1, the energy storage system 69 includes two compressed gas cylinder storage tanks 121 (5,000 psi, or 350 bars) mounted within the mid-chassis space 41 and configured to store compressed hydrogen gas. Employing more than two compressed gas cylinder storage tanks may be desirable to provide greater hydrogen storage capacity. Instead of compressed gas cylinder storage tanks 121, an alternate form of hydrogen storage may be employed such as metal or chemical hydrides. Hydrogen generation or reforming may also be used.

The energy conversion system 67 converts the energy stored by the energy storage system 69 to mechanical energy that propels the chassis 10. In the preferred embodiment, depicted in FIG. 1, the energy conversion system 67 includes a fuel cell stack 125 located in the rear axle area 18, and an electric traction motor 127 located in the front axle area 16. The fuel cell stack 125 produces a continuously available power of 94 kilowatts. Fuel cell systems for vehicular use are described in U.S. Pat. No. 6,195,999, issued Mar. 6, 2001 to General Motors Corporation; U.S. Pat. No. 6,223,843, issued May 1, 2001 to General Motors Corporation; U.S. Pat. No. 6,321,145, issued Nov. 20, 2001 to Delphi Technologies, Inc.; and U.S. Pat. No. 6,394,207, issued May 28, 2002 to General Motors Corporation; which are hereby incorporated by reference in their entireties.

The fuel cell stack 125 is operably connected to the compressed gas cylinder storage tanks 121 and to the traction motor 127. The fuel cell stack 125 converts chemical energy in the form of hydrogen from the compressed gas cylinder storage tanks 121 into electrical energy, and the traction motor 127 converts the electrical energy to mechanical energy, and applies the mechanical energy to rotate the front wheels 73, 75. Optionally, the fuel cell stack 125 and traction motor 127 are switched between the front axle area 16 and rear axle area 18. Optionally, the energy conversion system includes an electric battery (not shown) in hybrid combination with the fuel cell to improve chassis acceleration. Other areas provided between the structural elements are useful for housing other mechanisms and systems for providing the functions typical of an automobile as shown in FIGS. 2 and 3. Those skilled in the art will recognize other energy conversion systems 67 that may be employed within the scope of the present invention.

Figure 10:
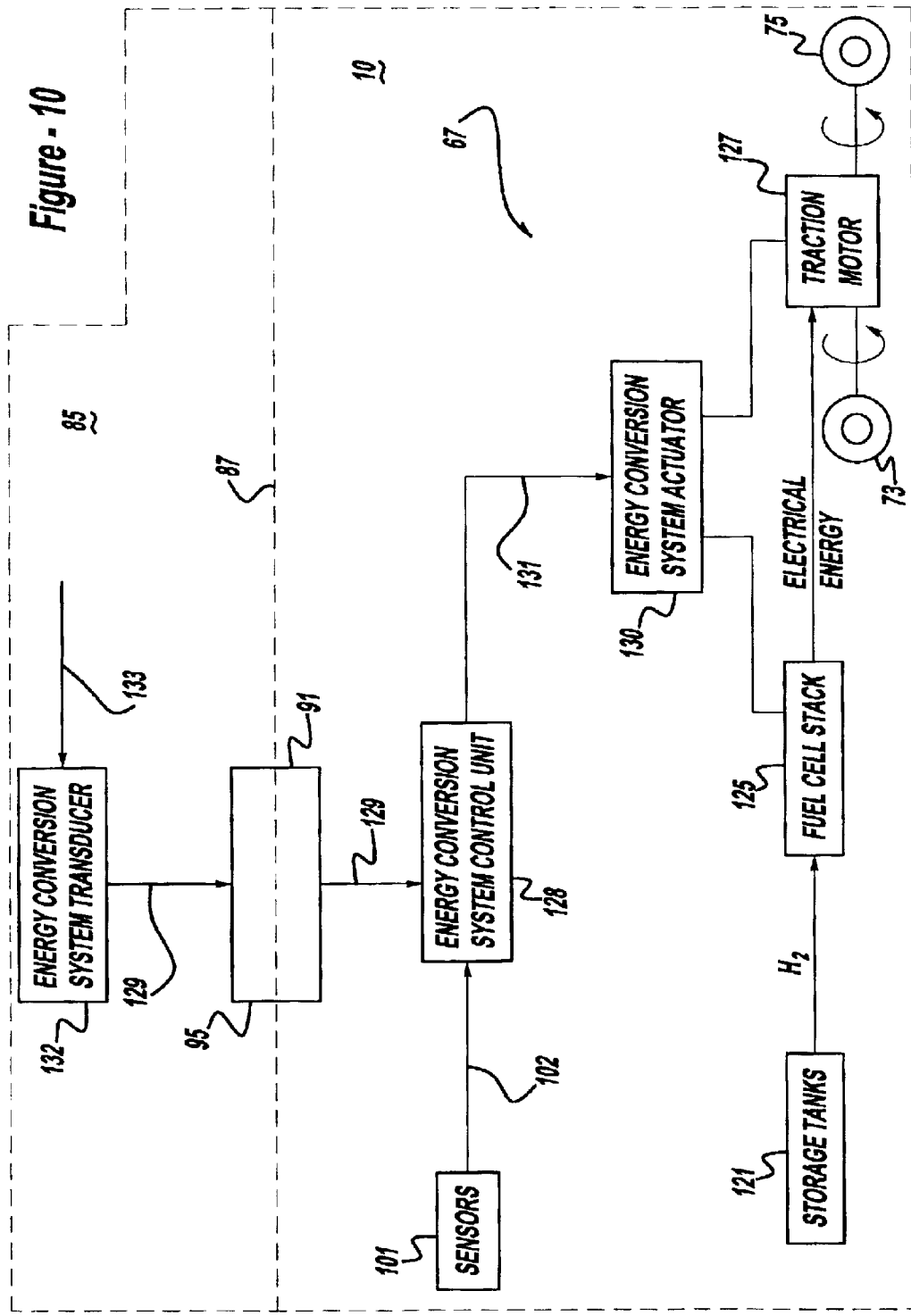
FIG. 10 is a schematic illustration of an energy conversion system for use with the rolling platform and body pod of FIG. 4.

The energy conversion system 67 is configured to respond to non-mechanical control signals. The energy conversion system 67 of the preferred embodiment is controllable by-wire, as depicted in FIG. 10. An energy conversion system control unit 128 is connected to the electrical connector 91 from which it receives electrical energy conversion system control signals 129, and sensors 101 from which it receives sensor signals 102 carrying information about various chassis conditions. In the preferred embodiment, the information conveyed by the sensor signals 102 to the energy conversion system control unit 128 includes chassis velocity, electrical current applied, rate of acceleration of the chassis, and motor shaft speed to ensure smooth launches and controlled acceleration. The energy conversion system control unit 128 is connected to an energy conversion system actuator 130, and transmits energy conversion system actuator control signals 131 to the energy conversion system actuator 130 in response to the electrical energy conversion system control signals 129 and sensor signals 102 according to a stored algorithm. The energy conversion system actuator 130 acts on the fuel cell stack 125 or traction motor 127 to adjust energy output. Those skilled in the art will recognize the various methods by which the energy conversion system actuator 130 may adjust the energy output of the energy conversion system. For example, a solenoid may alternately open and close a valve that regulates hydrogen flow to the fuel cell stack. Similarly, a compressor that supplies oxygen (from air) to the fuel cell stack may function as an actuator, varying the amount of oxygen supplied to the fuel cell stack in response to signals from the energy conversion system control unit.

An energy conversion system transducer 132 may be located on a vehicle body 85 and connected to a complementary electrical connector 95 engaged with the electrical connector 91. The energy conversion system transducer 132 is configured to convert mechanical energy conversion system control signals 133 to electrical energy conversion system control signals 129.

Figure 11:
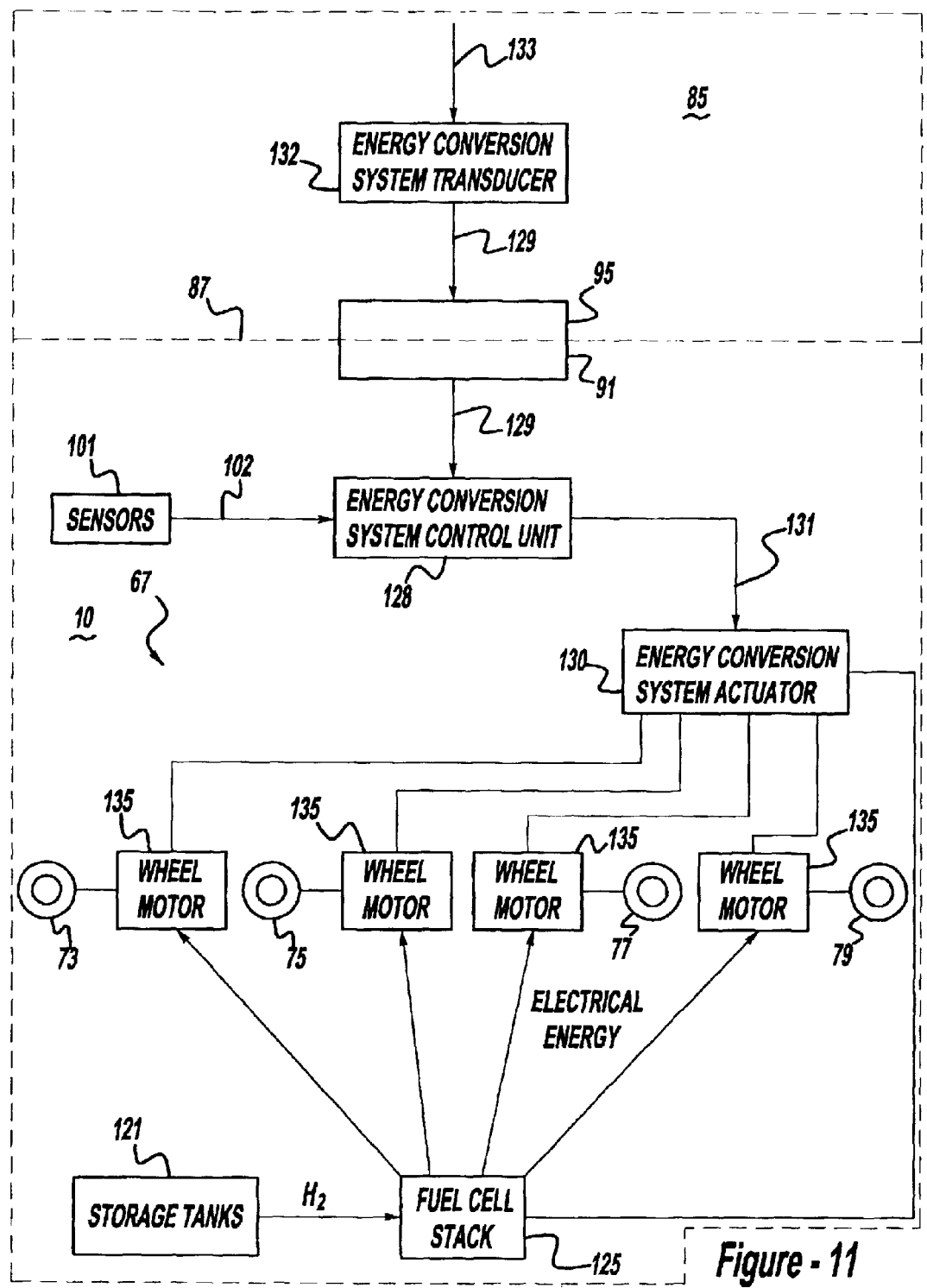
FIG. 11 is a schematic illustration of an alternative energy conversion system for use with the rolling platform and body pod of FIG. 4.

In another embodiment of the invention, as shown schematically in FIG. 11, wherein like reference numbers refer to like components from FIGS. 6–10, wheel motors 135, also known as wheel hub motors, are positioned at each of the four wheels 73, 75, 77, 79. Optionally, wheel motors 135 may be provided at only the front wheels 73, 75 or only the rear wheels 77, 79. The use of wheel motors 135 reduces the height of the chassis 10 compared to the use of traction motors, and therefore may be desirable for certain uses.

Referring again to FIG. 2, a conventional heat exchanger 137 and electric fan system 139, operably connected to the fuel cell stack 125 to circulate coolant for waste heat rejection, is carried in an opening that exists between the rear axle area 18 and the structural elements 54, 60. The heat exchanger 137 is set at an inclined angle to reduce its vertical profile, but to provide adequate heat rejection it also extends slightly above the top of elements 12, 26 (as seen in FIG. 4). Although the fuel cell stack 125, heat exchanger 137 and electric fan system 139 extend above the structural elements, their protrusion into the body pod space is relatively minor when compared to the engine compartment requirements of a conventionally designed automobile, especially when the chassis height of the preferred embodiment is approximately a mere 15 inches (28 centimeters). Optionally, the heat exchanger 137 is packaged completely within the chassis' structure with airflow routed through channels (not shown).

Referring again to FIG. 1, the suspension system 71 is mounted to the structural frame 11 and is connected to four wheels 73, 75, 77, 79. Those skilled in the art will understand the operation of a suspension system, and recognize that a multitude of suspension system types may be used within the scope of the claimed invention. The suspension system 71 of the preferred embodiment of the invention is electronically controlled, as depicted schematically in FIG. 12.

Figure 12:
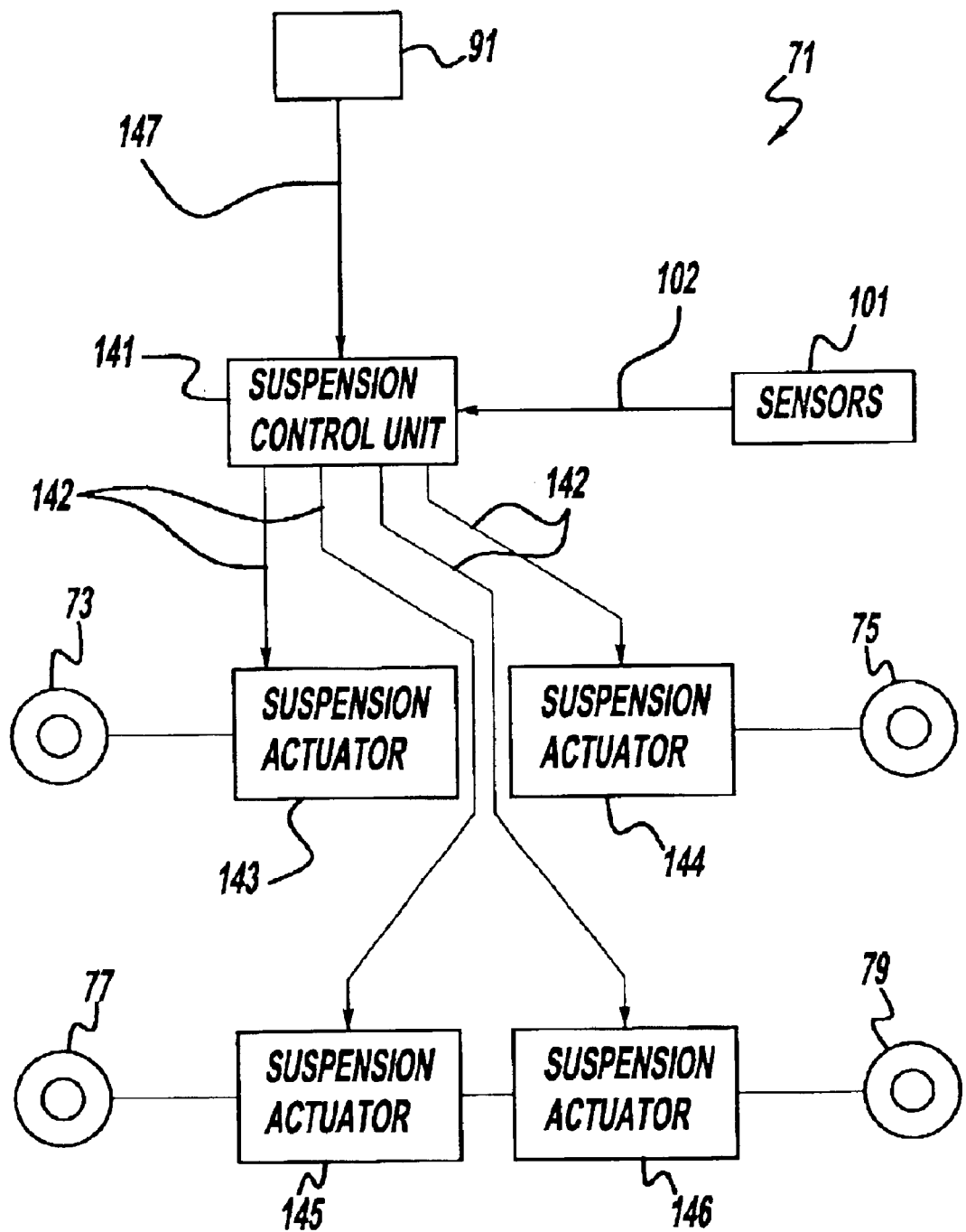
FIG. 12 is a schematic illustration of a suspension system for use with the rolling platform of FIGS. 1–5.

Referring to FIG. 12, the behavior of the electronically controlled suspension system 71 in response to any given road input is determined by a suspension control unit 141. Sensors 101 located on the chassis 10 monitor various conditions such as vehicle speed, angular wheel velocity, and wheel position relative to the chassis 10. The sensors 101 transmit the sensor signals 102 to the suspension control unit 141. The suspension control unit 141 processes the sensor signals 102 and generates suspension actuator control signals 142 according to a stored algorithm. The suspension control unit 141 transmits the suspension actuator control signals 142 to four suspension actuators 143, 144, 145, 146. Each suspension actuator 143, 144, 145, 146 is operably connected to a wheel 73, 75, 77, 79 and determines, in whole or in part, the position of the wheel 73, 75, 77, 79 relative to the chassis 10. The suspension actuators of the preferred embodiment are variable-force, real time, controllable dampers. The suspension system 71 of the preferred embodiment is also configured such that chassis ride height is adjustable. Separate actuators may be used to vary the chassis ride height.

In the preferred embodiment, the suspension control unit 141 is programmable and connected to the electrical connector 91 of the body-attachment interface 87. A vehicle user is thus able to alter suspension system 71 characteristics by reprogramming the suspension control unit 141 with suspension system software 147 via the electrical connector 91.

Figure 13:
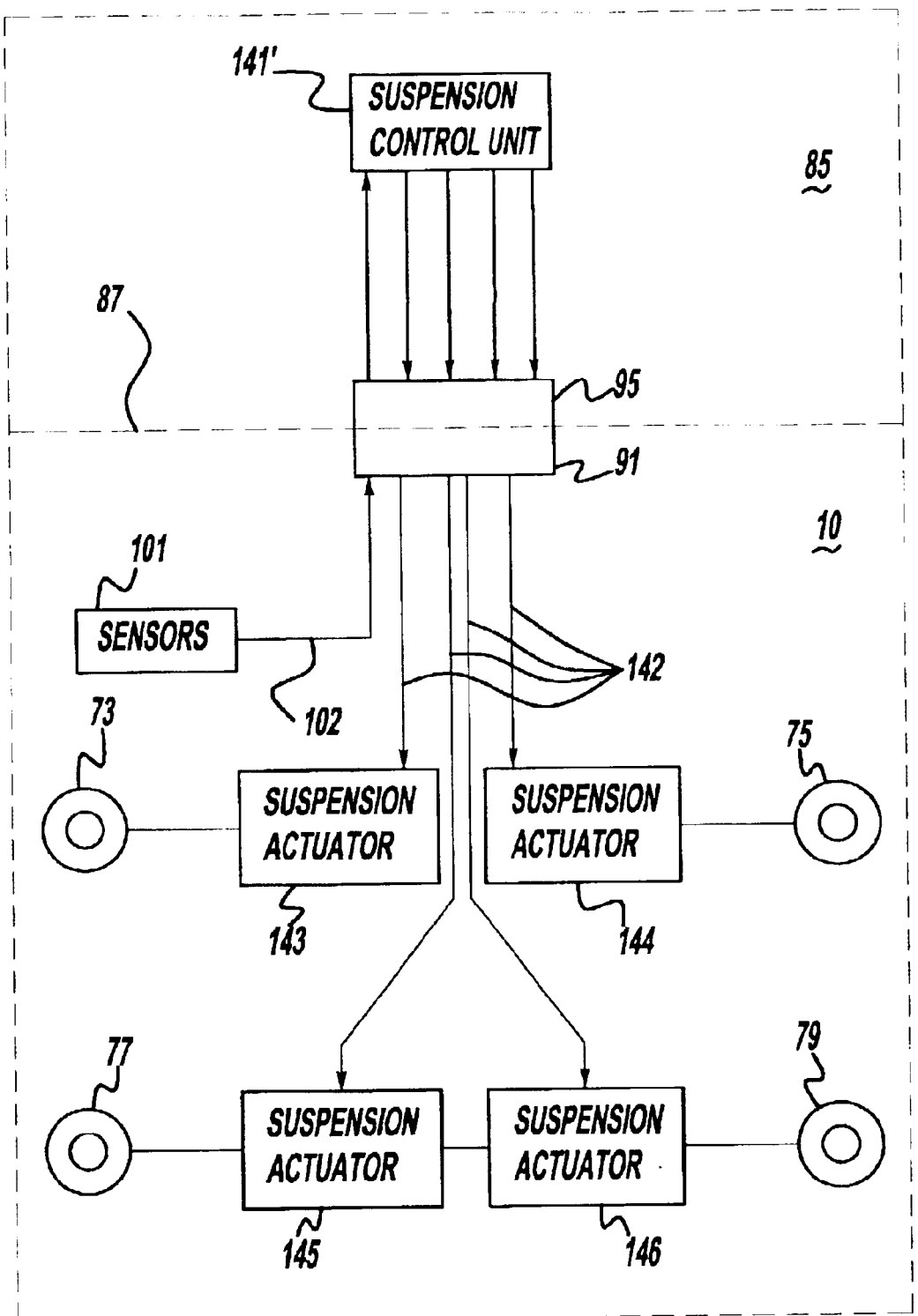
FIG. 13 is a schematic illustration of an alternative suspension system for use with the rolling platform and body pod of FIG. 4.

In the context of the claimed invention, electronically-controlled suspension systems include suspension systems without a suspension control unit located on the chassis 10. Referring to FIG. 13, wherein like reference numbers are used to reference like components from FIG. 12, suspension actuators 143, 144, 145, 146 and suspension sensors 101 are connected directly to the electrical connector 91. In such an embodiment, a suspension control unit 141' located on an attached vehicle body 85 can process sensor signals 102 transmitted through the electrical connector 91, and transmit suspension actuator control signals 142 to the suspension actuators 143, 144, 145, 146 via the electrical connector 91.

Examples of electronically controlled suspension systems are described in U.S. Pat. No. 5,606,503, issued Feb. 25, 1997 to General Motors Corporation; U.S. Pat. No. 5,609,353, issued Mar. 11, 1997 to Ford Motor Company; and U.S. Pat. No. 6,397,134, issued May 28, 2002 to Delphi Technologies, Inc.; which are hereby incorporated by reference in their entireties.

U.S. Pat. No. 6,397,134 describes an electronically controlled suspension system that provides improved suspension control through steering crossover events. In particular, the system senses a vehicle lateral acceleration and a vehicle steering angle and stores, for each direction of sensed vehicle lateral acceleration, first and second sets of enhanced suspension actuator control signals for the suspension actuators of the vehicle. Responsive to the sensed vehicle lateral acceleration and sensed vehicle steering angle, the system applies the first set of enhanced actuator control signals to the suspension actuators if the sensed steering angle is in the same direction as the sensed lateral acceleration and alternatively applies the second set of enhanced actuator control signals to the suspension actuators if the sensed steering angle is in the opposite direction as the sensed lateral acceleration.

U.S. Pat. No. 5,606,503 describes a suspension control system for use in a vehicle including a suspended vehicle body, four un-suspended vehicle wheels, four variable force actuators mounted between the vehicle body and wheels, one of the variable force actuators at each corner of the vehicle, and a set of sensors providing sensor signals indicative of motion of the vehicle body, motion of the vehicle wheels, a vehicle speed and an ambient temperature. The suspension control system comprises a microcomputer control unit including: means for receiving the sensor signals; means, responsive to the sensor signals, for determining an actuator demand force for each actuator; means, responsive to the vehicle speed, for determining a first signal indicative of a first command maximum; means, responsive to the ambient temperature, for determining a second signal indicative of a second command maximum; and means for constraining the actuator demand force so that it is no greater than a lesser of the first and second command maximums.

Electrically conductive wires (not shown) are used in the preferred embodiment to transfer signals between the chassis 10 and an attached body 85, and between transducers, control units, and actuators. Those skilled in the art will recognize that other non-mechanical means of sending and receiving signals between a body and a chassis, and between transducers, control units, and actuators may be employed and fall within the scope of the claimed invention. Other non-mechanical means of sending and receiving signals include radio waves and fiber optics.

The by-wire systems are networked in the preferred embodiment, in part to reduce the quantity of dedicated wires connected to the electrical connector 91. A serial communication network is described in U.S. Pat. No. 5,534,848, issued Jul. 9, 1996 to General Motors Corporation, which is hereby incorporated by reference in its entirety. An example of a networked drive-by-wire system is described in U.S. Patent Application Publication No. US 2001/0029408, Ser. No. 09/775,143, which is hereby incorporated by reference in its entirety. Those skilled in the art will recognize various networking devices and protocols that may be used within the scope of the claimed invention, such as SAE J1850 and CAN ("Controller Area Network"). A TTP ("Time Triggered Protocol") network is employed in the preferred embodiment of the invention for communications management.

Figure 14:
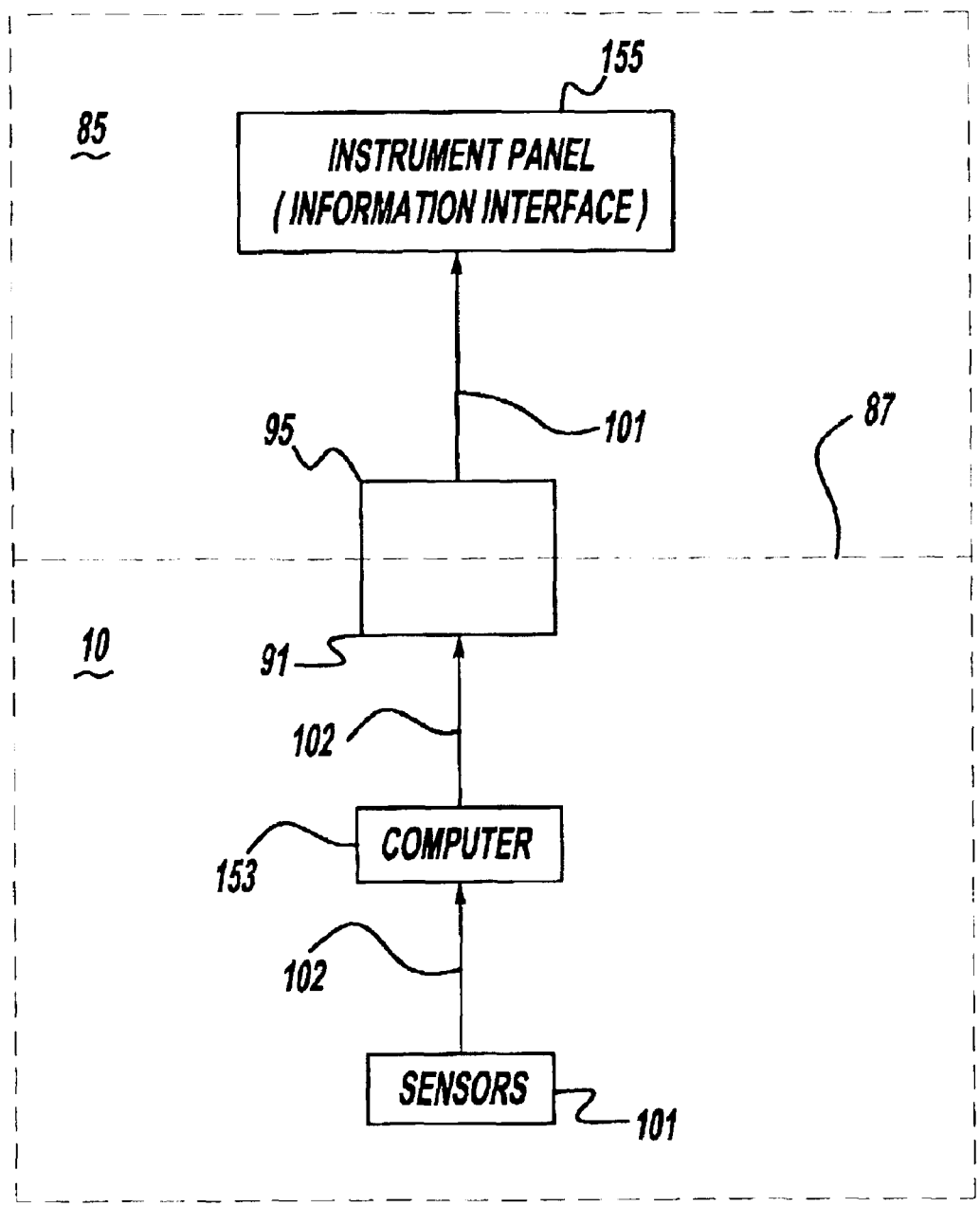
FIG. 14 is a schematic illustration of a chassis computer and chassis sensors for use with the rolling platform and body pod of FIG. 4.

Some of the information collected by the sensors 101, such as chassis velocity, fuel level, and system temperature and pressure, is useful to a vehicle driver for operating the chassis and detecting system malfunctions. As shown in FIG. 14, the sensors 101 are connected to the electrical connector 91 through a chassis computer 153. Sensor signals 102 carrying information are transmitted from the sensors 101 to the chassis computer 153, which processes the sensor signals 102 according to a stored algorithm. The chassis computer 153 transmits the sensor signals 102 to the electrical connector 91 when, according to the stored algorithm, the sensor information is useful to the vehicle driver. For example, a sensor signal 102 carrying temperature information is transmitted to the electrical connector 91 by the chassis computer 153 when the operating temperature of the chassis 10 is unacceptably high. A driver-readable information interface 155 may be attached to a complementary electrical connector 95 coupled with the electrical connector 91 and display the information contained in the sensor signals 102. Driver-readable information interfaces include, but are not limited to, gauges, meters, LED displays, and LCD displays. The chassis may also contain communications systems, such as antennas and telematics systems, that are operably connected to an electrical connector in the body-attachment interface and configured to transmit information to an attached vehicle body.

Figure 15:
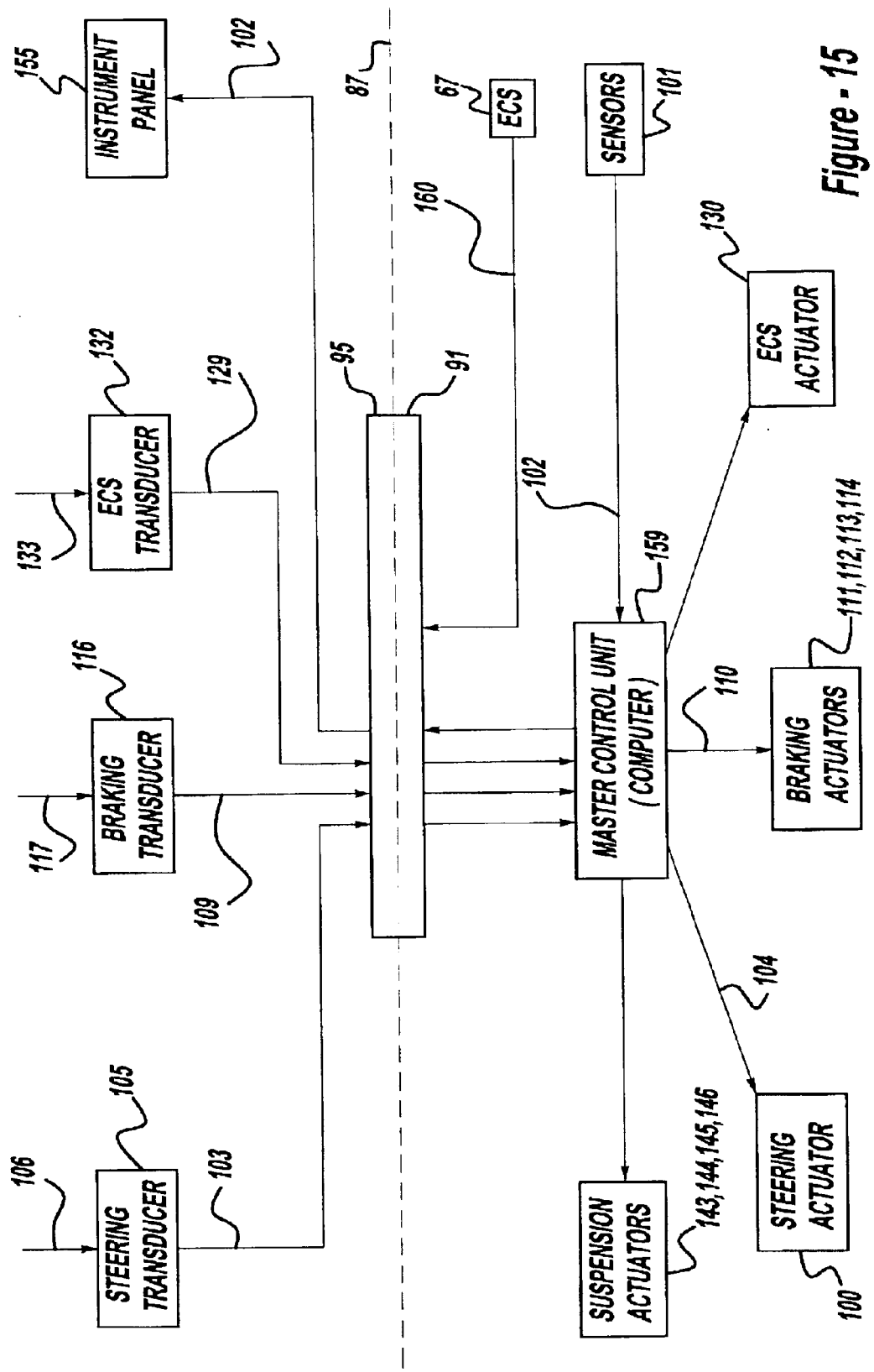
FIG. 15 is a schematic illustration of a master control unit with a suspension system, braking system, steering system, and energy conversion system for use with the rolling platform and body pod of FIG. 4.

One control unit may serve multiple functions. For example, as shown in FIG. 15, a master control unit 159 functions as the steering control unit, braking control unit, suspension control unit, and energy conversion system control unit.

Referring again to FIG. 15, the energy conversion system 67 is configured to transmit electrical energy 160 to the electrical connector 91 to provide electric power for systems located on an attached vehicle body, such as power windows, power locks, entertainment systems, heating, ventilating, and air conditioning systems, etc. Optionally, if the energy storage system 69 includes a battery, then the battery may be connected to the electrical connector 91. In the preferred embodiment, the energy conversion system 67 includes a fuel cell stack that generates electrical energy and is connected to the electrical connector 91.

Figure 16:
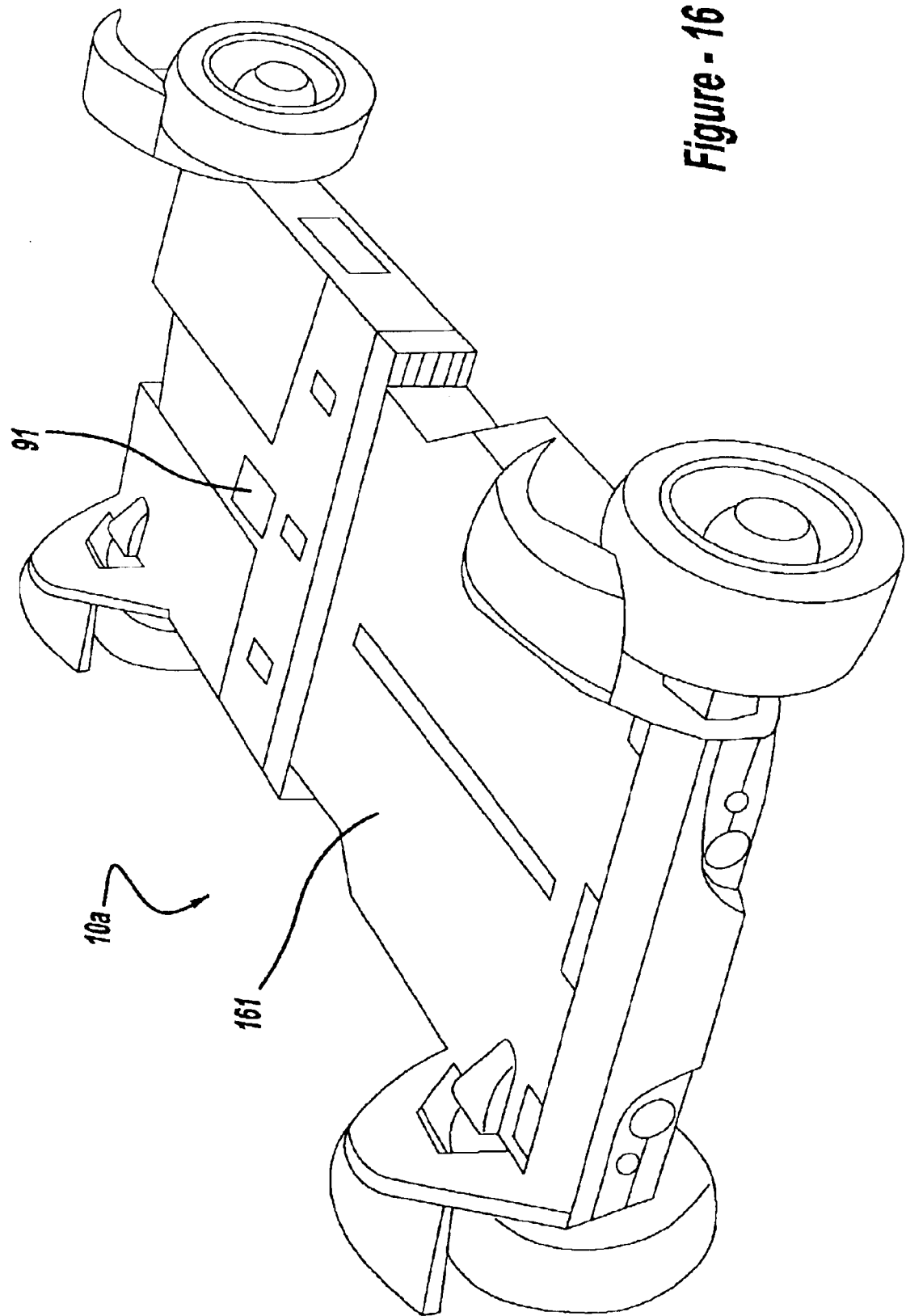
FIG. 16 is a perspective illustration of a skinned rolling platform.
Figure 17:
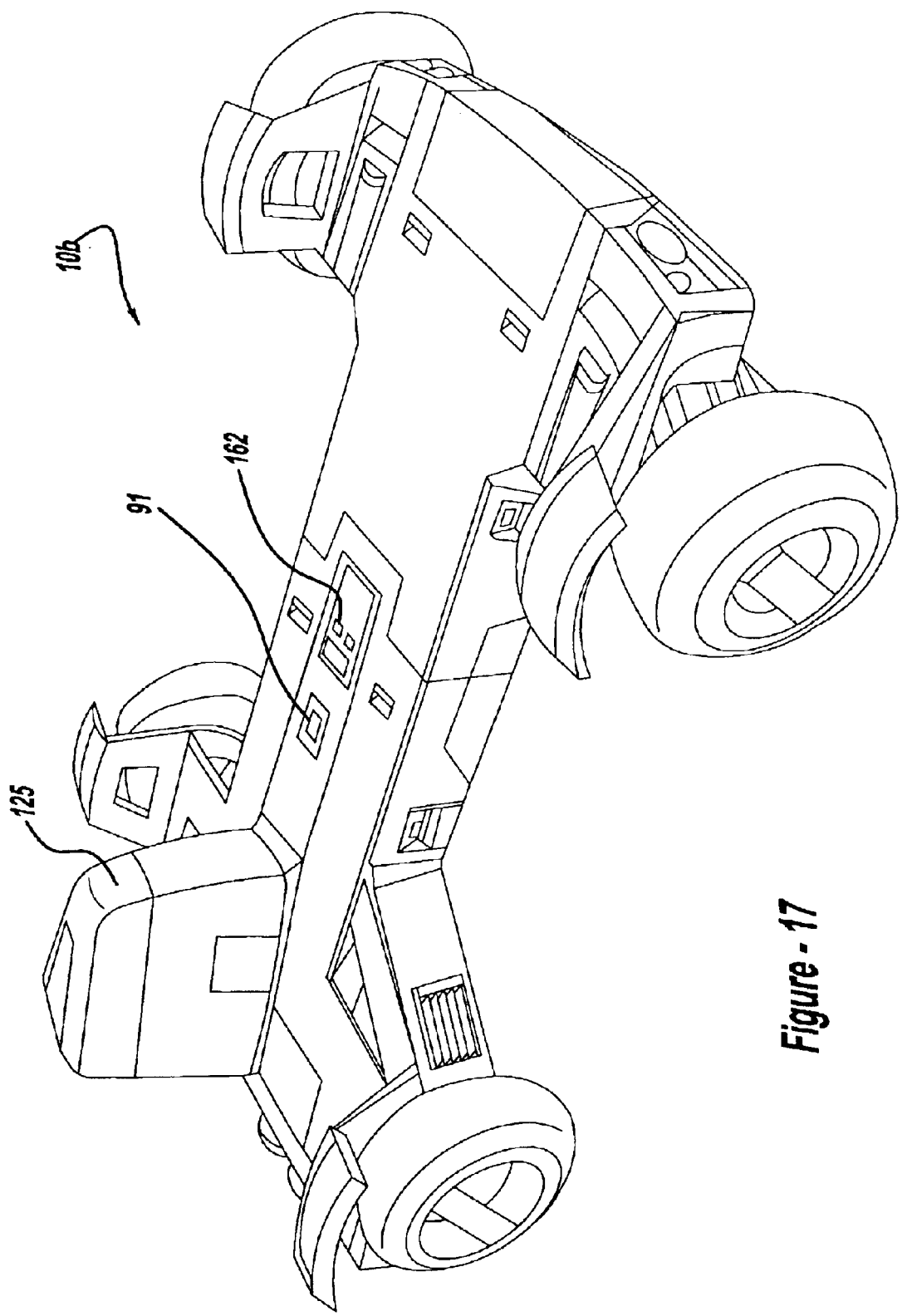
FIG. 17 is a perspective illustration of another embodiment of a skinned rolling platform.

FIG. 16 shows a chassis 10*a* with rigid covering, or "skin," 161 and an electrical connector or coupling 91 that functions as an umbilical port. The rigid covering 161 may be configured to function as a vehicle floor, which is useful if an attached vehicle body does not have a lower surface. In FIG. 17, a similarly equipped chassis 10*b* is shown with an optional vertical fuel cell stack 125. The vertical fuel cell stack 125 protrudes significantly into the body pod space which is acceptable for some applications. The chassis 10*b* also includes a manual parking brake interface 162 that may be necessary for certain applications and therefore is also optionally used with other embodiments.

Figure 18:
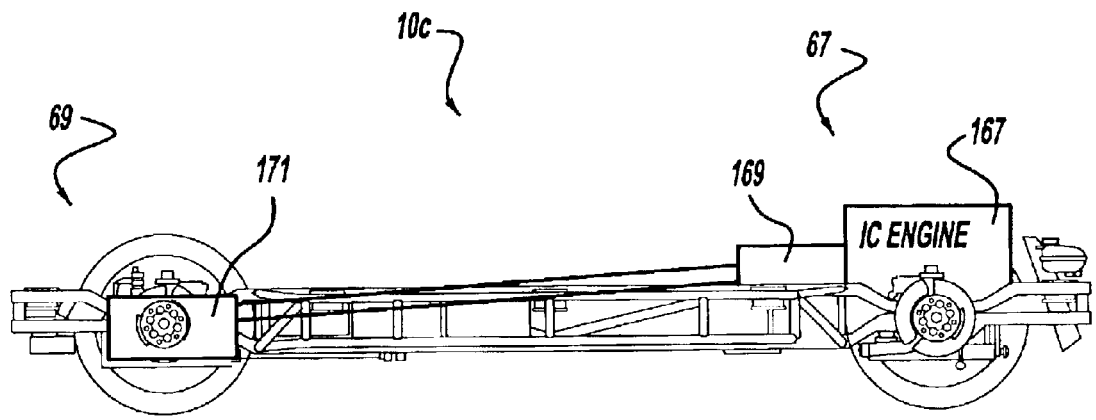
FIG. 18 is a side schematic illustration of another embodiment of the rolling platform with an energy conversion system including an internal combustion engine, and gasoline tanks.

FIG. 18 depicts an embodiment of the rolling platform 10*c* that may be advantageous in some circumstances. The energy conversion system 67 includes an internal combustion engine 167 with horizontally-opposed cylinders, and a transmission 169. The energy storage system 69 includes a gasoline tank 171.

Figure 19:
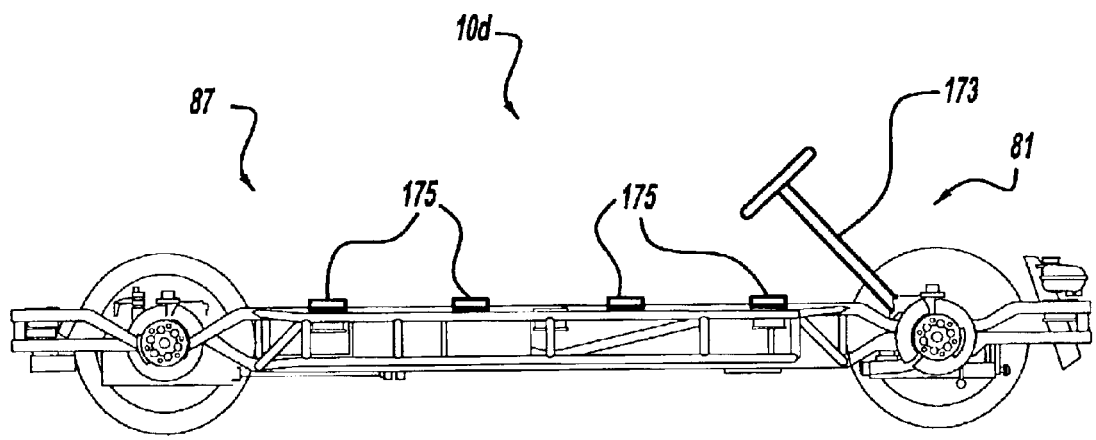
FIG. 19 is a side schematic illustration of yet another embodiment of the rolling platform, with a mechanical steering linkage and passenger seating attachment couplings.

FIG. 19 depicts an embodiment of the rolling platform 10*d* wherein the steering system 81 has mechanical control linkages including a steering column 173. Passenger seating attachment couplings 175 are present on the body attachment interface 87, allowing the attachment of passenger seating assemblies to the chassis 10*d*.

Figure 20A:
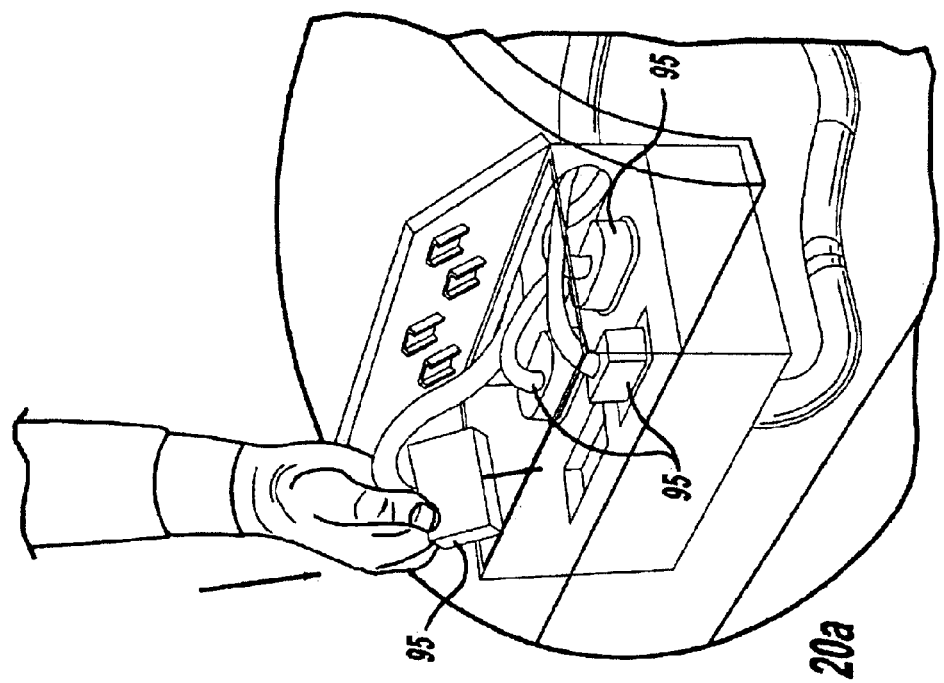
FIGS. 20 and 20a show partial exploded perspective schematic illustrations of yet another embodiment of the rolling platform in an attachment scenario with a body pod, the rolling platform having multiple electrical connectors engageable with complementary electrical connectors in the body pod.
Figure 20:
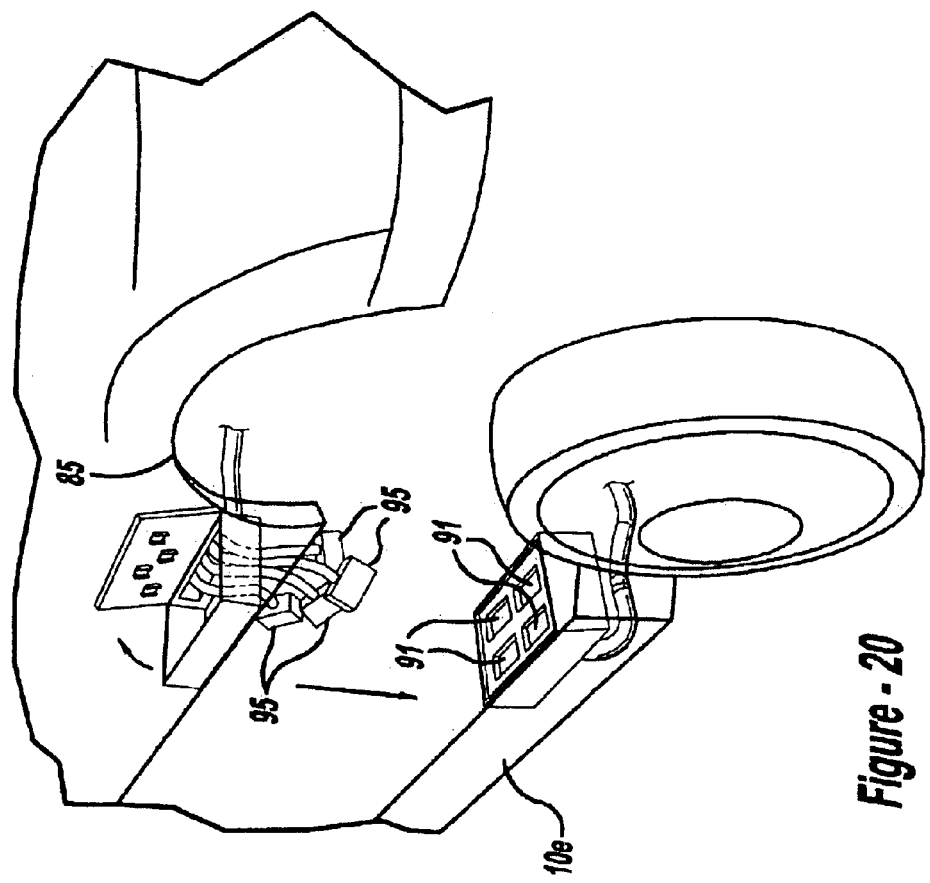

FIGS. 20 and 20*a* depict a chassis 10*e* within the scope of the invention and a body 85 each having multiple electrical connectors 91 and multiple complementary electrical connectors 95, respectively. For example, a first electrical connector 91 may be operably connected to the steering system and function as a control signal receiver. A second electrical connector 91 may be operably connected to the braking system and function as a control signal receiver. A third electrical connector 91 may be operably connected to the energy conversion system and function as a control signal receiver. A fourth electrical connector 91 may be operably connected to the energy conversion system and function as an electrical power connector. Four multiple wire in-line connectors and complementary connectors are used in the embodiment shown in FIGS. 20 and 20a. FIG. 20a depicts an assembly process for attaching corresponding connectors 91, 95.

Figure 21:
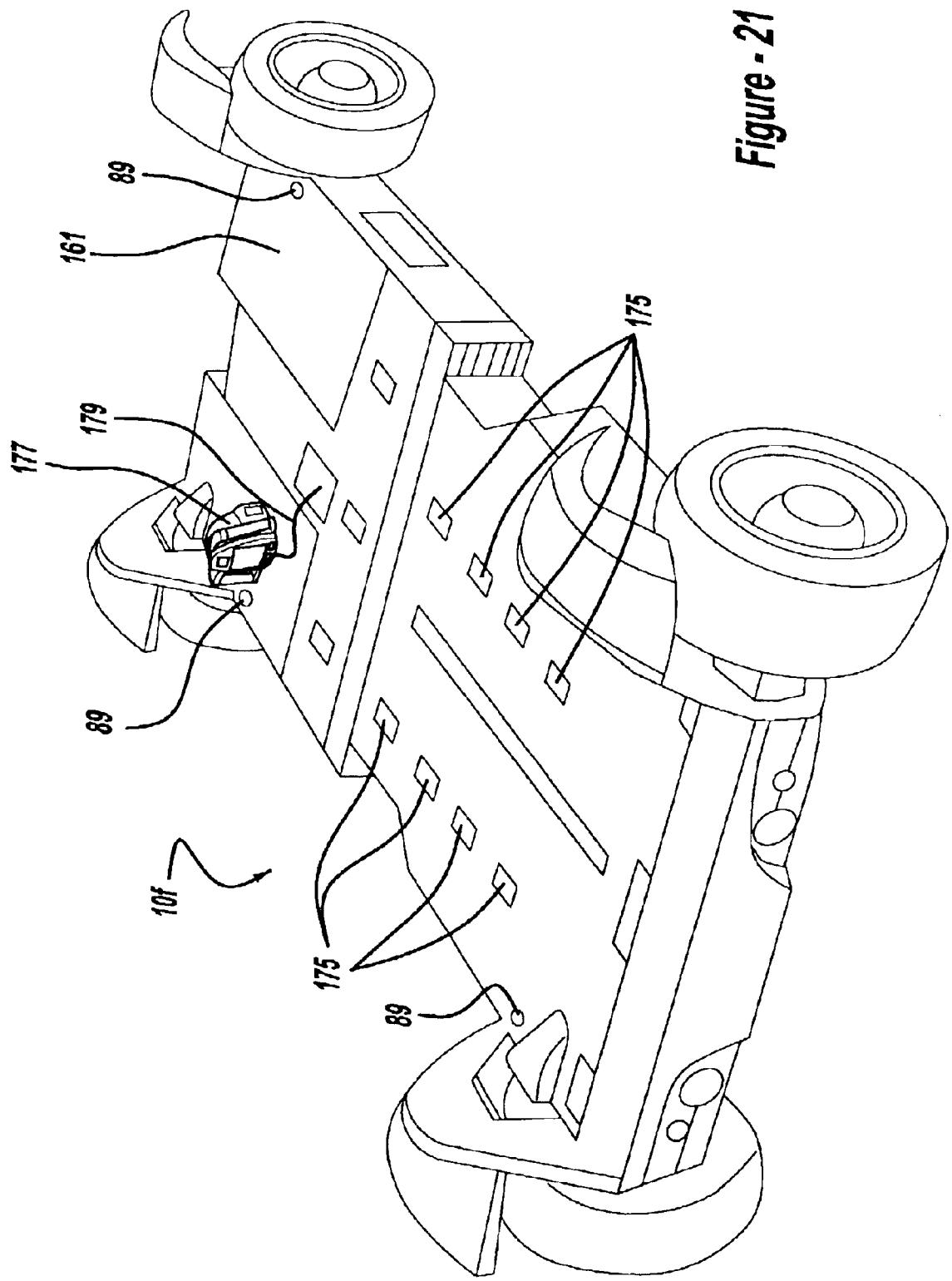
FIG. 21 is a perspective schematic illustration of yet another skinned rolling platform, the rolling platform having a movable control input device.

Referring to FIG. 21, a further embodiment of the rolling platform 10f is depicted. The chassis 10f has a rigid covering 161 and a plurality of passenger seating attachment couplings 175. A driver-operable control input device 177 containing a steering transducer, a braking transducer, and an energy conversion system transducer, is operably connected to the steering system, braking system, and energy conversion system by wires 179 and movable to different attachment points.

The embodiment depicted in FIG. 21 enables bodies of varying designs and configurations to mate with a common chassis design. A vehicle body without a lower surface but having complementary attachment couplings is matable to the chassis 10f at the load-bearing body retention couplings 89. Passenger seating assemblies may be attached at passenger seating attachment couplings 175.

Figure 22:
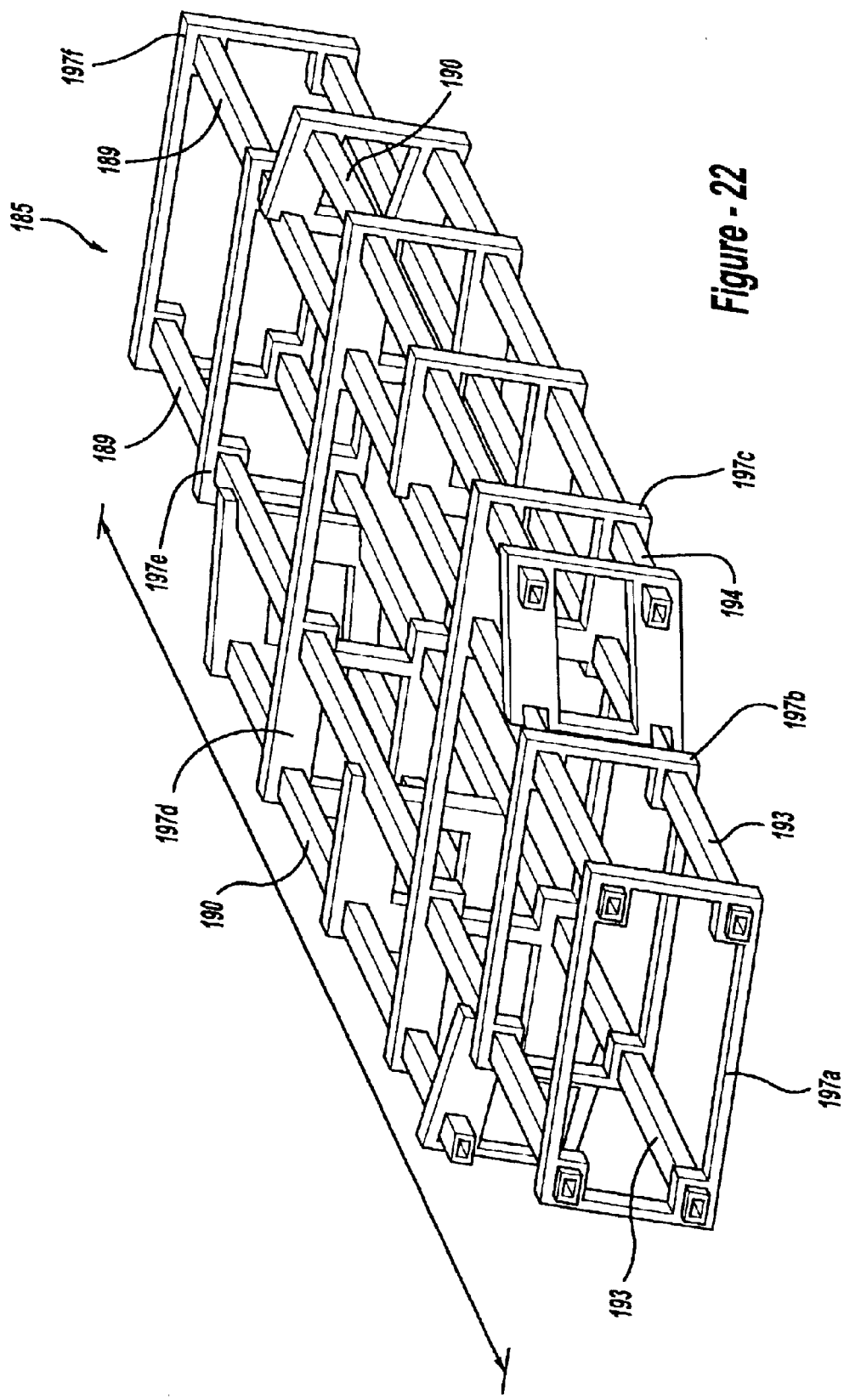
FIG. 22 is a perspective schematic illustration of an alternative structural frame for use with the rolling platforms of FIGS. 1–5, 16–19, and 21.

FIG. 22 is a schematic depiction of an alternative first structural frame 185 that may be advantageously used with the chassis of FIGS. 1–5, 16–19, and 21. The structural frame 185 includes a first selection of generally longitudinally-oriented elongated members, including upper midsection members 189, upper lateral section members 190, lower midsection members 193, and lower lateral section members 194. The lower midsection members 193 and lower lateral section members 194 are spaced a vertical distance from the upper midsection members 189 and upper lateral section members 190. The elongated members 189, 190, 193, 194 are depicted as tubular with a rectangular cross-section, and are preferably a light metal such as aluminum. However, those skilled in the art will recognize a variety of members of varying cross-sectional geometries and materials that are suitable for use in an automotive structural frame and that fall within the scope of the claimed invention.

The first structural frame 185 also includes a first set of unitary structural members 197a, 197b, 197c, 197d, 197e, 197f. The unitary structural members 197a, 197b, 197c, 197d, 197e, 197f are transversely-oriented within the structural frame 185 and are substantially parallel to one another. Each unitary structural member 197a, 197b, 197c, 197d, 197e, 197f extends transversely and vertically between the upper midsection members 189 and lower midsection members 193, and is attached to, and thereby interconnects, the upper midsection members 189 and lower midsection members 193. Unitary structural members 197c, 197d also extend transversely and vertically between upper lateral section members 190 and lower lateral section members 194, and are attached to, and thereby interconnect, upper lateral section members 190 and lower lateral section members 194. In the preferred embodiment, the elongated members 189, 190, 193, 194 are welded to the unitary structural members 197a, 197b, 197c, 197d, 197e, 197f. The first structural frame has a first configuration, including length L.

Unitary structural members 197a, 197b, 197c, 197d, 197e, 197f are arranged perpendicular to the longitudinal direction of the structural frame. However, in the context of the present invention, a "transversely oriented" unitary structural member, or a unitary structural member that "extends transversely," interconnects two generally longitudinally oriented elongated members spaced transversely apart from one another, and may be positioned at other than a right angle with respect to the longitudinal direction of the structural frame.

Figure 23:
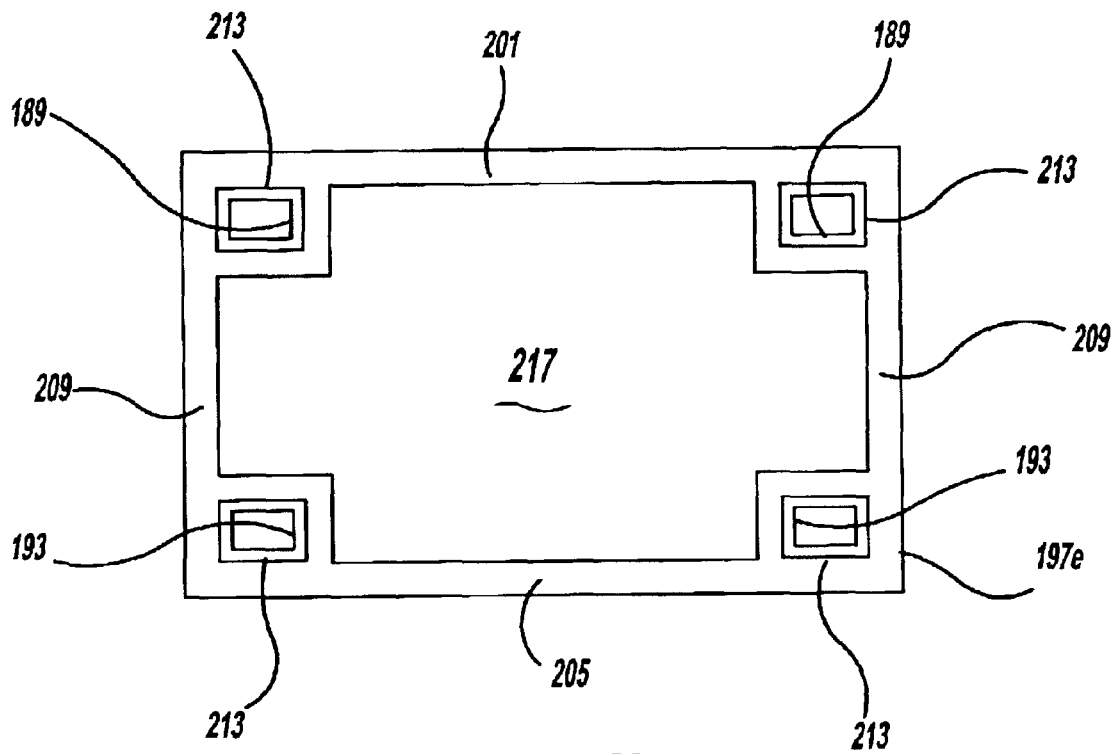
FIG. 23 is a schematic sectional illustration of the structural frame of FIG. 22.

FIG. 23 is a schematic sectional view of the first structural frame 185 depicted in FIG. 22 taken through unitary structural member 197e. Unitary structural members 197a, 197b and 197f are similar to unitary structural member 197e. Unitary structural member 197e includes an upper cross member portion 201, a lower cross member portion 205, and two vertically-oriented portions 209 spaced a distance apart and connecting the upper cross member portion 201 and lower cross member portion 205. The unitary structural member 197e also includes four cavities 213, configured to at least partially retain elongated members 189, 193. The elongated members 189, 193 are partially located within the cavities 213 and are retained in a rectangular arrangement. The cavities of unitary structural member 197e are holes that restrict the movement of the elongated members vertically and transversely. The upper cross member portion 201, lower cross member portion 205, and vertically-oriented portions 209 define an open space 217. The open space 217 facilitates the packaging of vehicle hardware within the structural frame.

Figure 24:
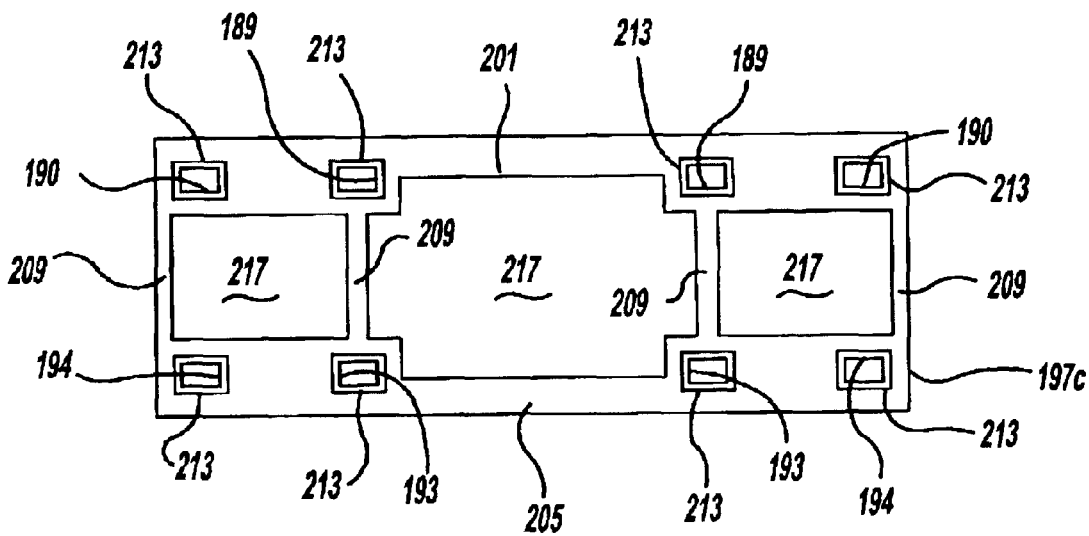
FIG. 24 is another schematic sectional illustration of the structural frame of FIG. 22.

FIG. 24 is a schematic sectional view of the first structural frame 185 from FIG. 22 taken through unitary structural member 197c, which is similar to unitary structural member 197d. Unitary structural member 197c includes an upper cross member portion 201, a lower cross member portion 205, and four vertically-oriented portions 209 spaced a distance apart from one another and connecting the upper cross member portion 201 and the lower cross member portion 205. Unitary structural member 197c also includes eight cavities 213 configured to at least partially retain elongated members 189, 190, 193, 194. Elongated members 189, 190, 193, 194 are each at least partially located within one of the cavities 213, and are retained in a rectangular arrangement relative to one another. The upper cross member portion 201, lower cross member portion 205, and vertically-oriented portions 209 form three open spaces 217.

Figure 25:
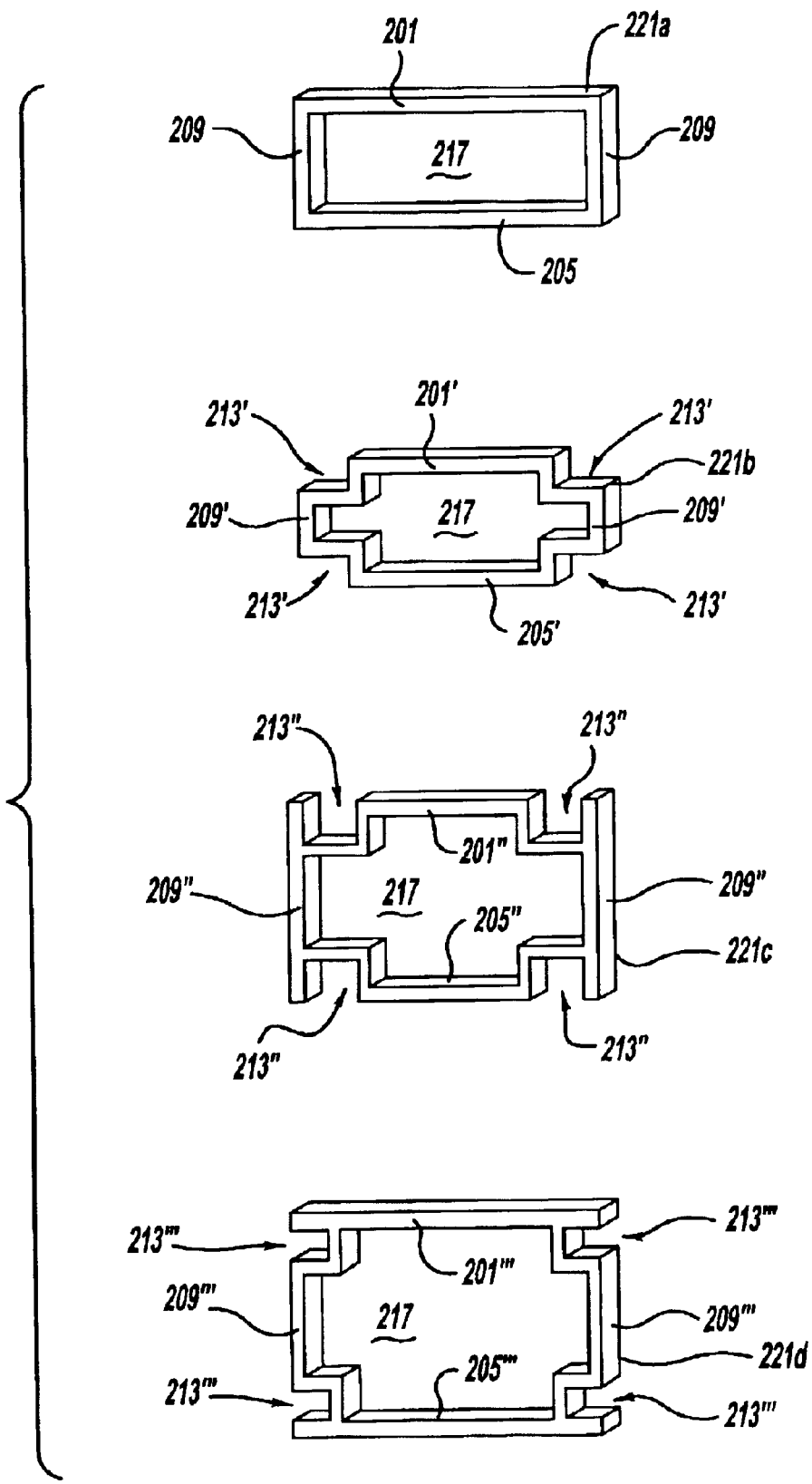
FIG. 25 is a schematic perspective illustration of alternative unitary structural members for use with the structural frame of FIG. 22.

FIG. 25, wherein like reference numbers refer to like components from FIGS. 22–24, schematically depicts alternative unitary structural members 221a, 221b, 221c, 221d. Each of the unitary structural members 221a, 221b, 221c, 221d includes an upper cross member portion 201, 201', 201", 201'" a lower cross member portion 205, 205', 205", 205'" and two vertically-oriented portions 209, 209', 209", 209'" spaced a distance apart and connecting the upper cross member portion 201, 201', 201", 201'" to the lower cross member portion 205, 205', 205", 205'". Unitary structural members 221b, 221c, 221d include cavities 213', 213", 213'" configured to at least partially retain longitudinally oriented elongated members.

Figure 26:
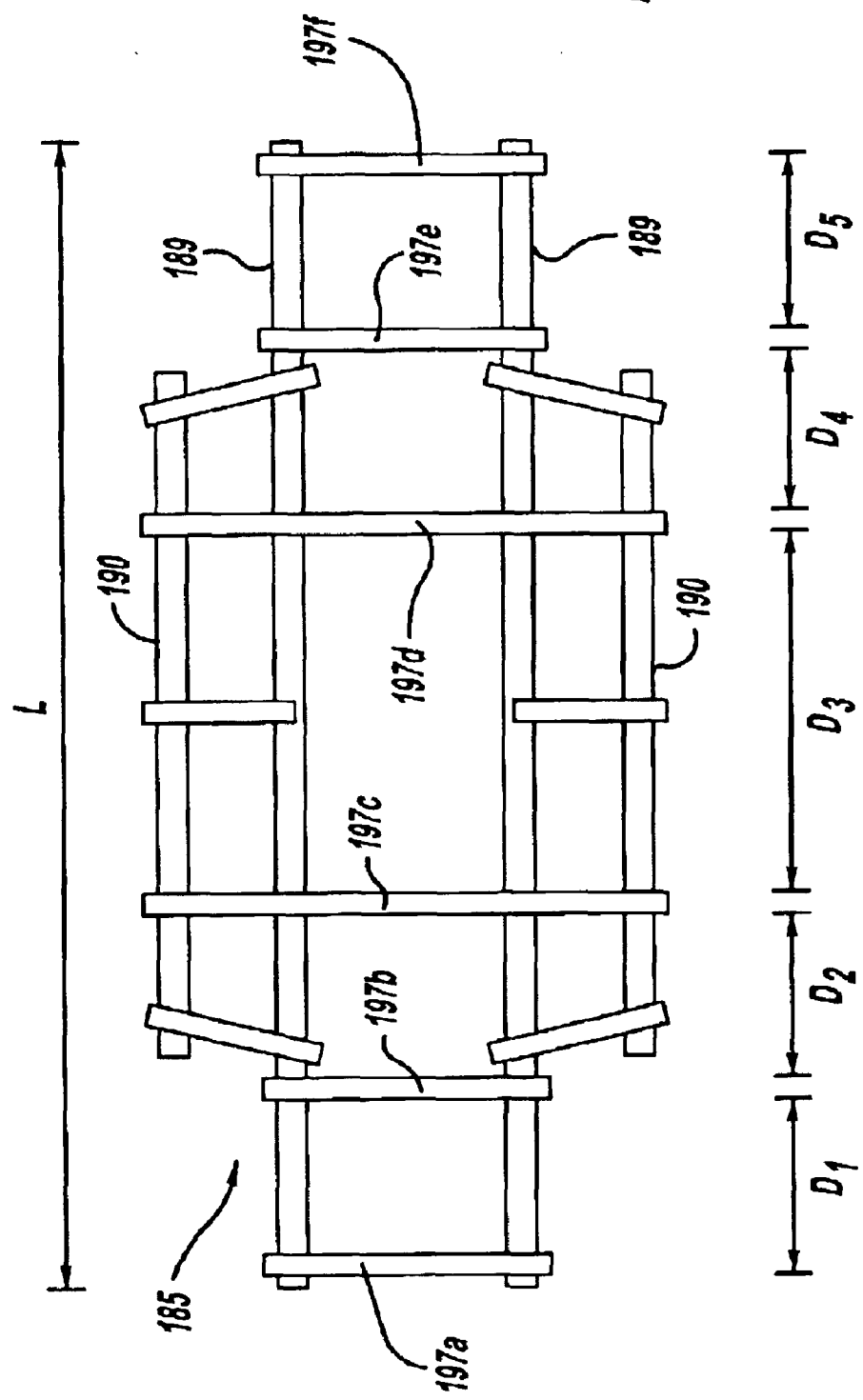
FIG. 26 is a schematic plan illustration of the structural frame of FIG. 22.

Referring to FIG. 26, wherein like reference numbers refer to like components from FIGS. 22–25, a schematic plan view of the first structural frame 185 depicted in FIG. 22 is shown. The structural frame 185 has an overall length L. Unitary structural members 197a, 197b, 197c, 197d, 197e are each spaced a distance from one another. Unitary structural members 197a and 197b are spaced a distance $D_1$ apart. Unitary structural members 197b and 197c are spaced a distance $D_2$ apart. Unitary structural members 197c and 197d are spaced a distance $D_3$ apart. Unitary structural members 197d and 197e are spaced a distance $D_4$ apart. Unitary structural members 197e and 197f are spaced a distance $D_5$ apart. Elongated members 189 have a first length which results in overall chassis length L.

Figure 27:
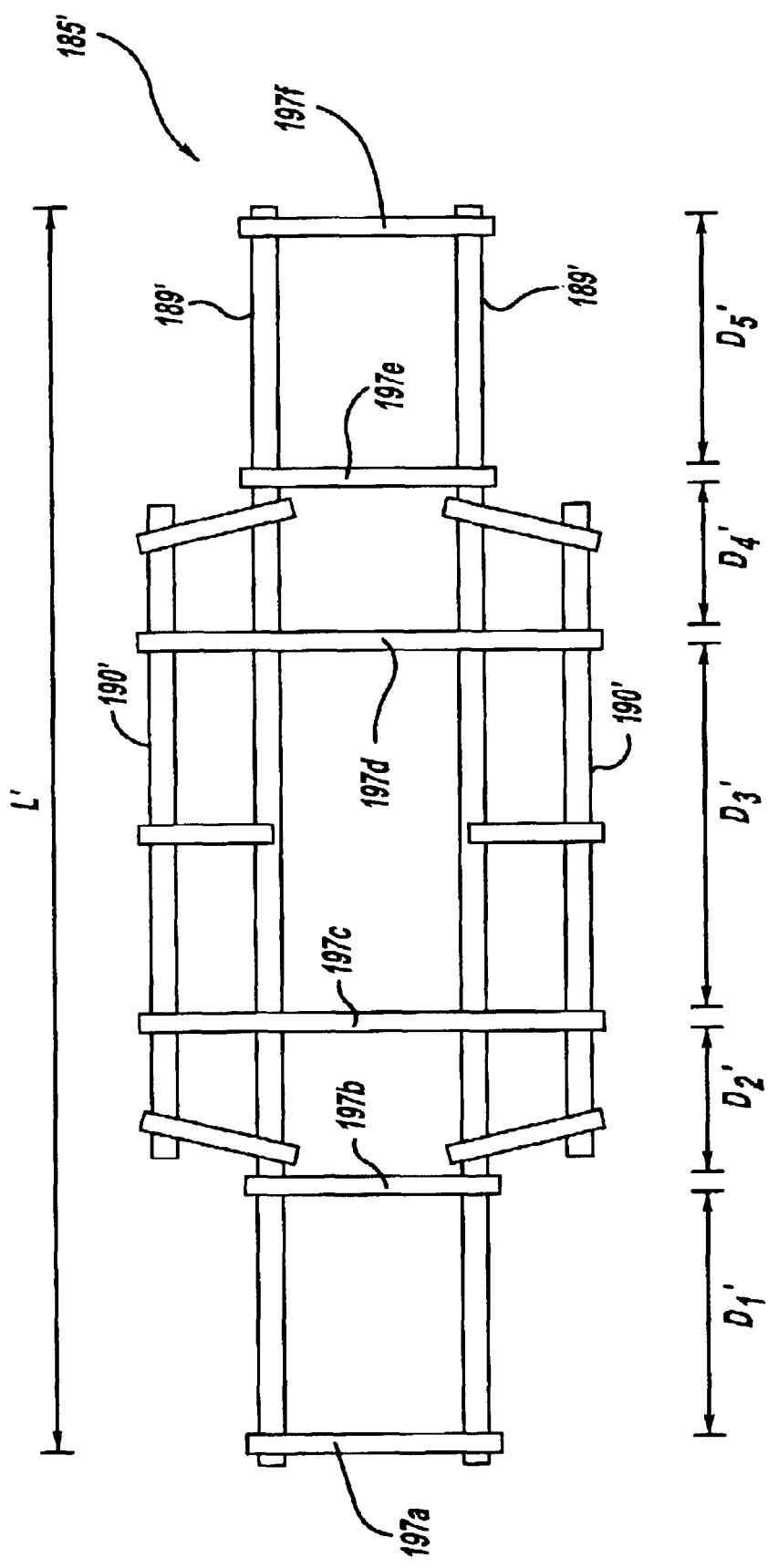
FIG. 27 is a schematic plan illustration of another structural frame having a different configuration from the structural frame of FIGS. 22 and 26.

Referring to FIG. 27, wherein like reference numbers refer to like components from FIGS. 22–26, a second structural frame 185' having a second configuration is schematically depicted. The second structural frame 185' includes a second selection of longitudinally-oriented elongated members, including upper midsection members 189' and upper lateral section members 190'. The elongated members 189', 190' of the second selection are sufficiently differently dimensioned from the elongated members of the first selection such that second configuration is different from the first configuration. Elongated members 189', 190' are longer than similar elongated members 189, 190 in the first selection, resulting in a second chassis length L', which is greater than length L of the first structural frame 185 depicted in FIG. 26.

The second structural frame 185' includes a second set of unitary structural members 197a, 197b, 197c, 197d, 197e, 197f that is substantially identical to the first set of unitary structural members. To accommodate the longer elongated members 189', 190', the unitary structural members 197a, 197b, 197c, 197d, 197e, 197f of the second set are spaced apart a greater distance from one another than the unitary structural members of the first set. In the second structural frame 185', unitary structural members 197a and 197b are spaced distance $D_1'$ apart, unitary structural members 197b and 197c are spaced a distance $D_2'$ apart, unitary structural members 197c and 197d are spaced a distance $D_3'$ apart, unitary structural members 197d and 197e are spaced a distance $D_4'$ apart, and unitary structural members 197e and 197f are spaced a distance $D_5'$ apart, wherein $D_1'$ is greater than $D_1$, $D_2'$ is greater than $D_2$, $D_3'$ is greater than $D_3$, $D_4'$ is greater than $D_4$, and $D_5'$ is greater than $D_5$.

Figure 28:
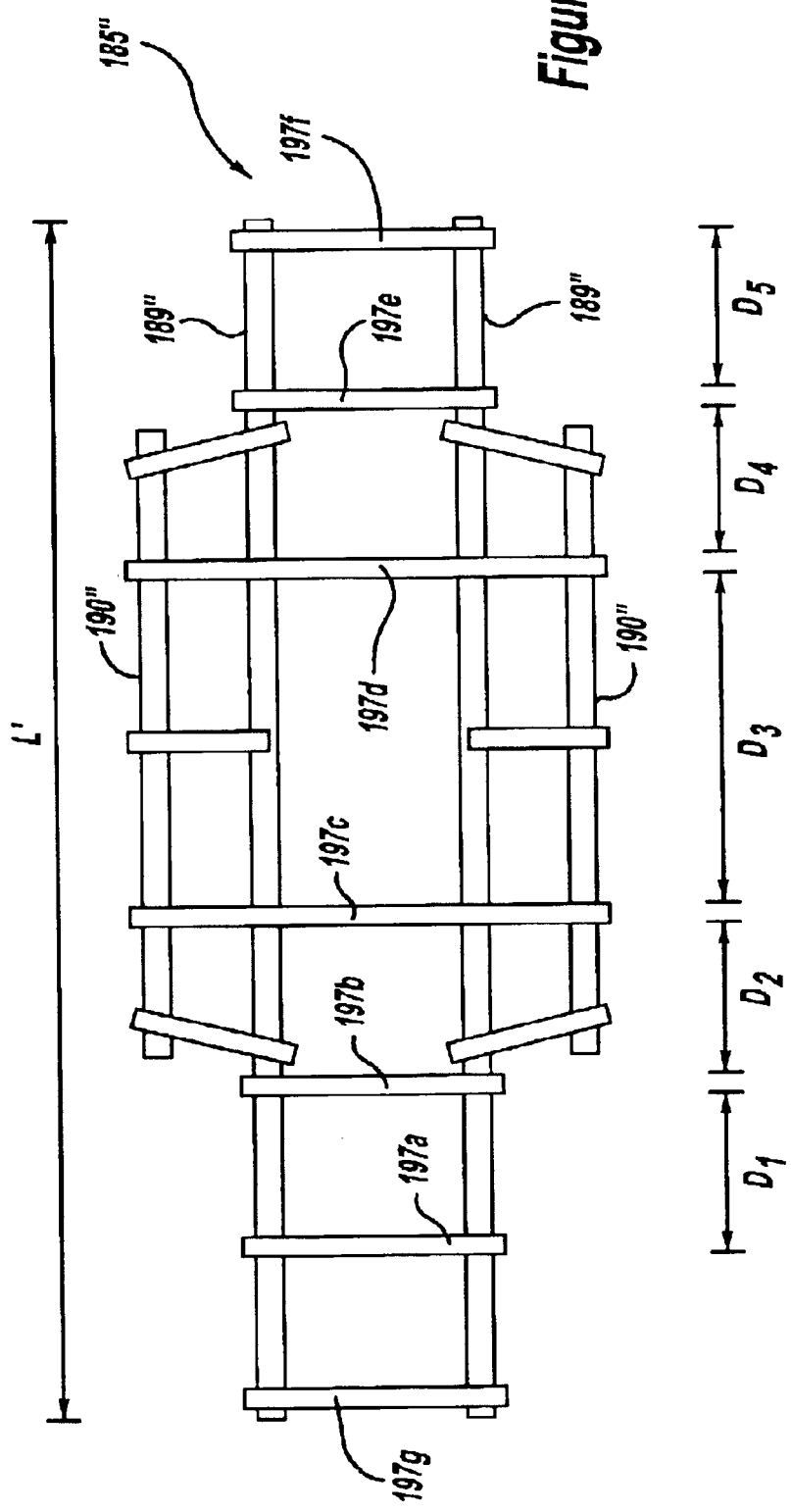
FIG. 28 is a schematic plan illustration of yet another structural frame having a different configuration from the structural frames of FIGS. 22, 26, and 27.

Referring to FIG. 28, wherein like reference numbers refer to like components from FIGS. 22–27, a third structural frame 185" having a third configuration is schematically depicted. The third structural frame 185" includes a third selection of longitudinally-oriented elongated members, including upper midsection members 189" and upper lateral section members 190". The elongated members 189", 190" of the third selection are sufficiently differently dimensioned from the elongated members of the first selection such that third configuration is different from the first configuration. Elongated members 189", 190" are longer than similar elongated members 189, 190 in the first selection, resulting in a second chassis length L', which is greater than length L of the first structural frame 185 depicted in FIG. 26.

The third structural frame 185" includes a third set of unitary structural members 197a, 197b, 197c, 197d, 197e, 197f, 197g that is substantially identical to the first set of unitary structural members, except that the quantity of unitary structural members in the third set is greater than the quantity of elongated members of the first set. Unitary structural member 197g is used to accommodate longer elongated members 189", 190". Unitary structural members 197a, 197b, 197c, 197d, 197e, 197f are identically spaced relative to one another in the third structural frame 185" as in first structural frame 185.

Figure 29:
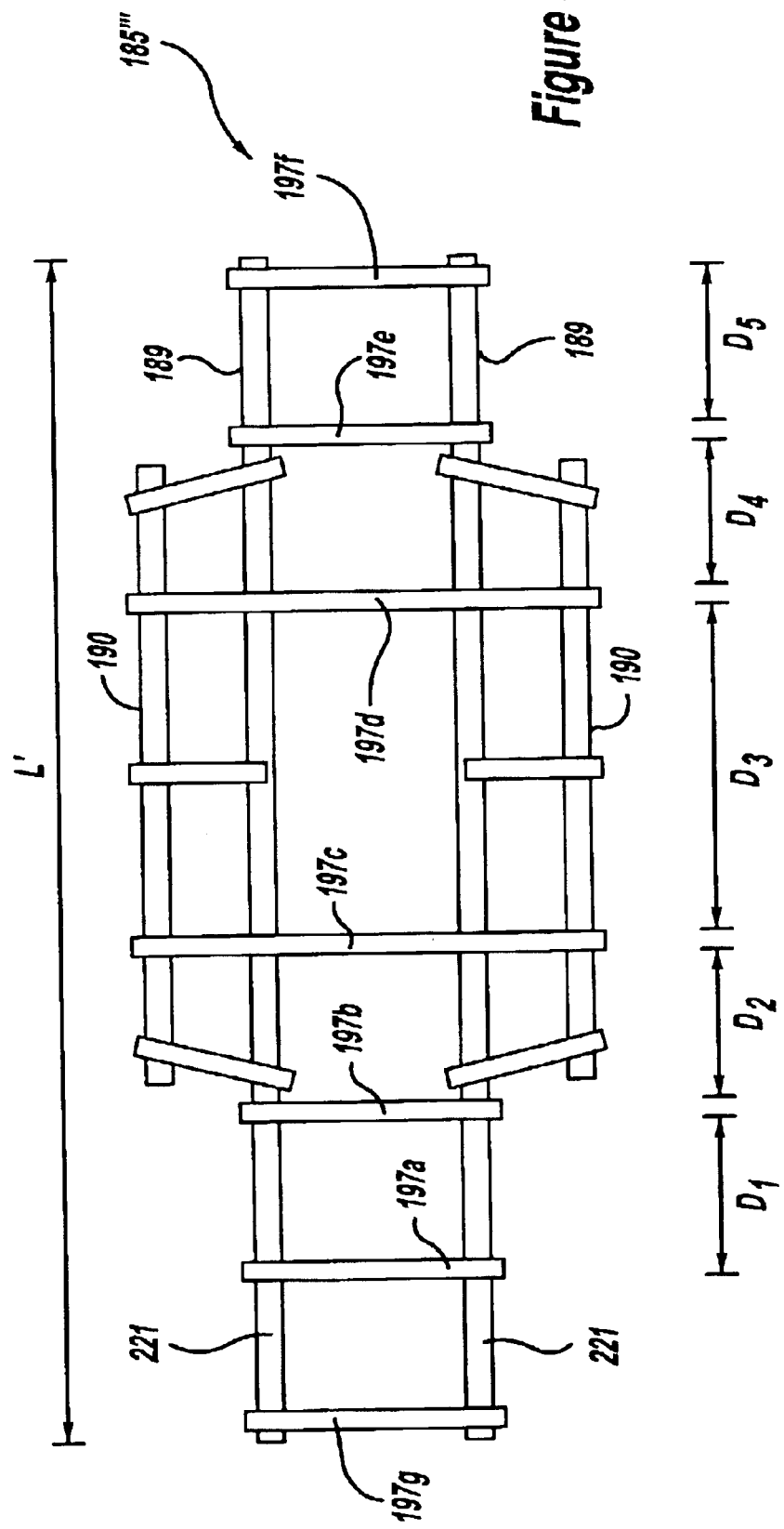
FIG. 29 is a schematic plan illustration of yet another structural frame having a different configuration from the structural frames of FIGS. 22, 26–28.

FIG. 29, wherein like reference numbers refer to like components from FIGS. 22–28, is a schematic depiction of a fourth structural frame 185''' having a fourth configuration. The fourth structural frame 185''' includes a fourth selection of longitudinally-oriented elongated members and a fourth set of unitary structural members. The fourth selection of elongated members differs from the first selection of elongated members only in the quantity of elongated members.

The fourth selection contains additional midsection members 221 not present in the first selection of elongated members that are connected to unitary structural members 197a and 197g, resulting in the fourth structural frame 185''' having an overall length L' which is greater than the length L of the first structural frame 185 depicted in FIG. 26.

Figure 30:
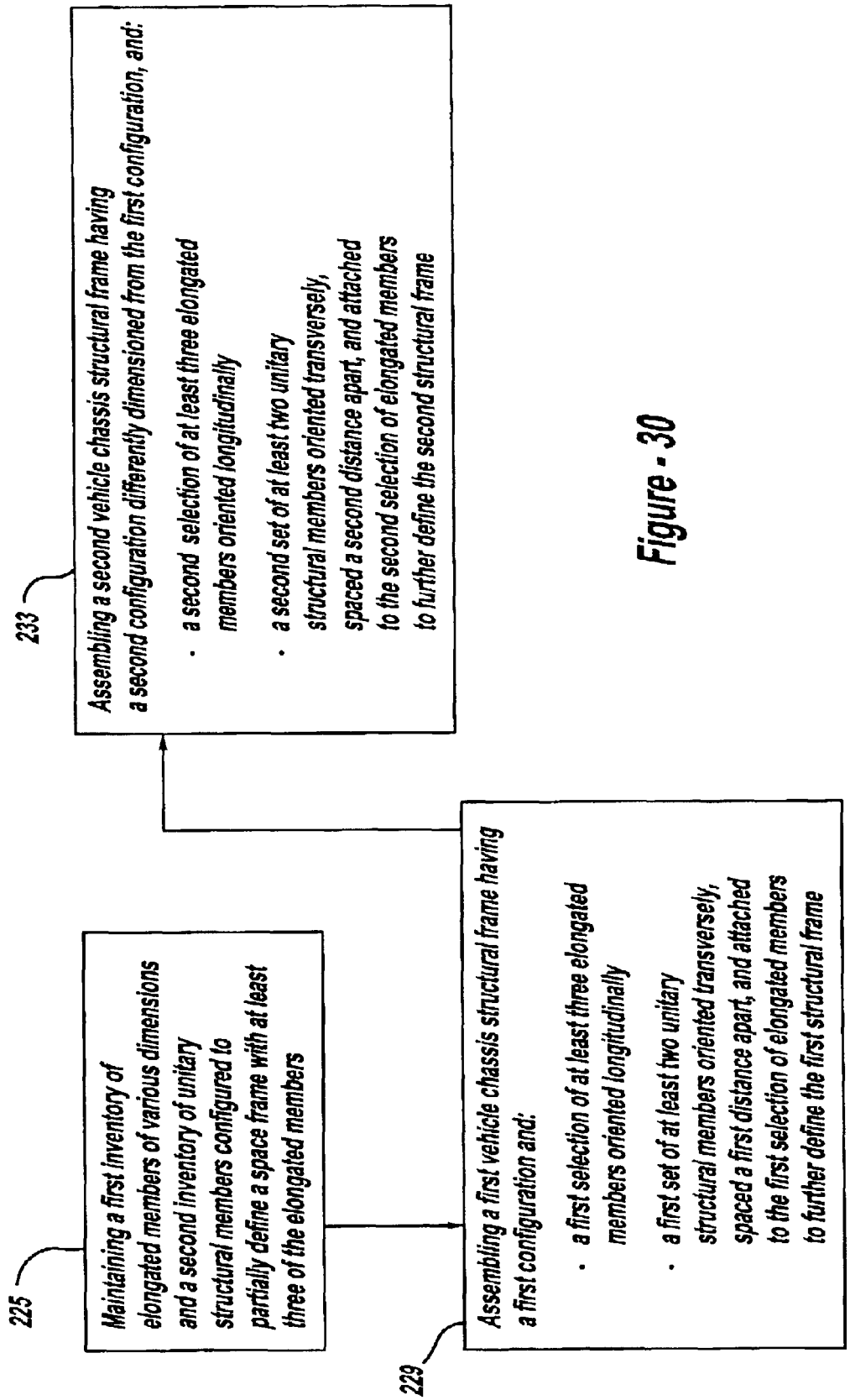
FIG. 30 is a schematic illustration of a method of assembling vehicle chassis structural frames.

FIG. 30 depicts a method for advantageously employing elongated members and unitary structural members to assemble structural frames of differing configurations. The method includes maintaining a first inventory of elongated members of various lengths and a second inventory of unitary structural members configured to at least partially define a structural frame with at least three of the elongated members 225.

The method further includes assembling a first vehicle structural frame having a first configuration 229, including a first length. The first vehicle structural frame has a first selection of at least three elongated members selected from the first inventory and oriented generally longitudinally. At least one of the elongated members of the first selection is vertically spaced from the other elongated members of the first selection, and at least one of the elongated members of the first selection is transversely spaced from the other elongated members of the first selection. The first vehicle structural frame also has a first set of at least two unitary structural members selected from the second inventory. The unitary structural members of the first set are oriented transversely, spaced a first distance apart from one another, and are attached to, and thereby interconnect, the first selection of elongated members to further define the first structural frame.

The method further includes assembling a second vehicle chassis structural frame having a second configuration 233, including a second length. The second vehicle structural frame has a second selection of at least three elongated members selected from the first inventory and oriented generally longitudinally. At least one of the elongated members of the second selection is vertically spaced from the other elongated members of the second selection, and at least one of the elongated members of the second selection is transversely spaced from the other elongated members of the second selection. The second vehicle chassis also has a second set of at least two unitary structural members selected from the second inventory. The unitary structural members of the second set are oriented transversely, spaced a second distance apart, and are attached to, and thereby interconnect, the second selection of elongated members to further define the second structural frame.

The elongated members of the second selection are sufficiently differently dimensioned from the elongated members of the first selection, or the first quantity of elongated members differs from the second quantity of elongated members, such that the second configuration is differently-dimensioned from the first configuration.

It may be advantageous in some circumstances if the second distance is different from the first distance. Similarly, it may be advantageous in some circumstances for the quantity of unitary structural members in the first set to be different from the quantity of unitary structural members in the second set.

At least one of the unitary structural members may include at least three cavities configured to at least partially locate the at least three longitudinally-oriented elongated members for attachment to the unitary structural member. At least one of the unitary structural members may define an open space to facilitate the accommodation of vehicle chassis hardware.

The first set of elongated members and the second set of elongated members may each include at least four elongated members, and at least one of the unitary structural members in each of the first set of unitary structural members and the second set of elongated structural members may include at least four cavities configured to at least partially locate the at least four elongated members.

Similarly, the first set of elongated members and the second set of elongated members may each include at least eight elongated members, and at least one of the unitary structural members in each of the first set of unitary structural members and the second set of elongated structural members may include at least eight cavities configured to at least partially locate the at least eight elongated members.

Figure 31:
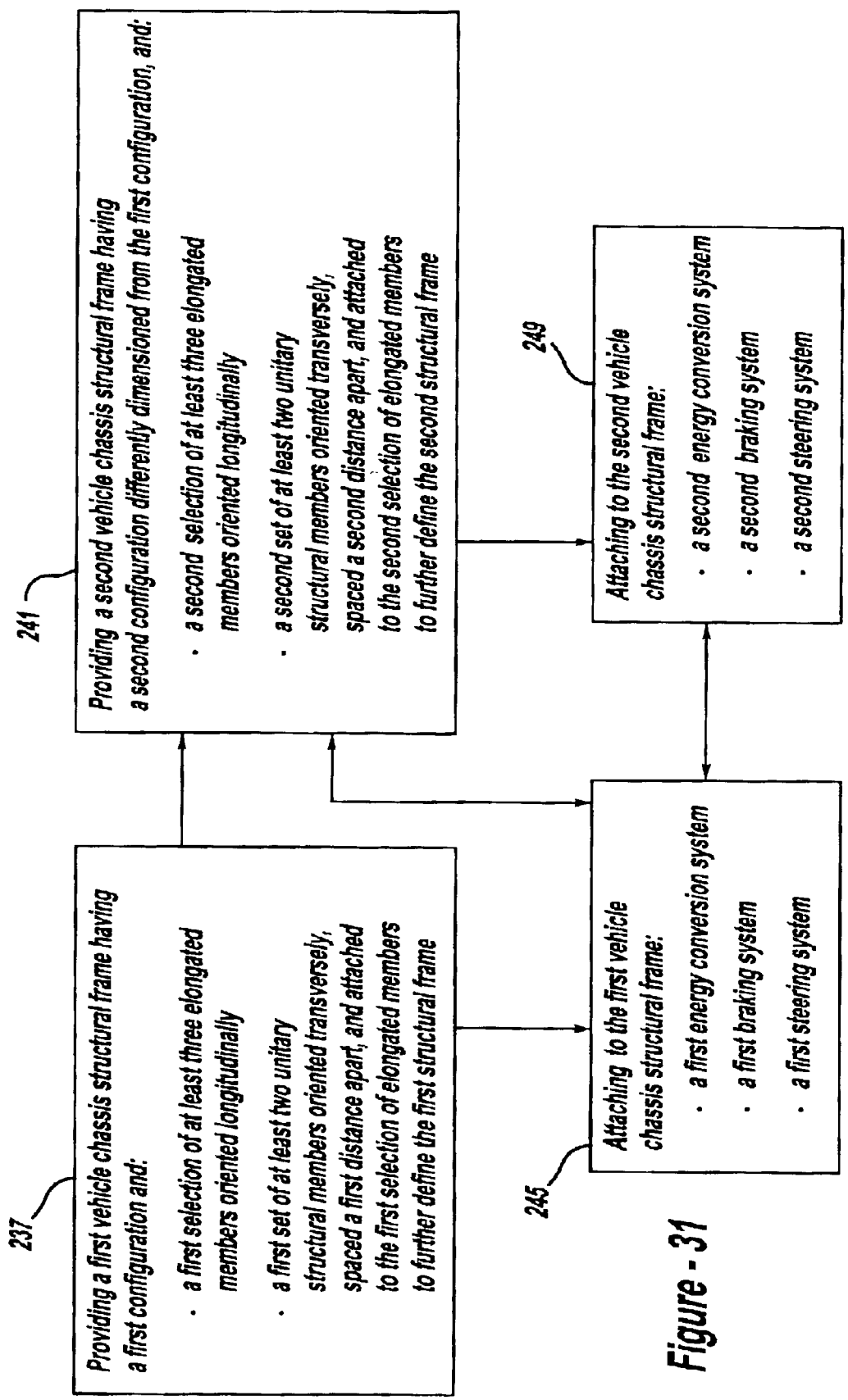
FIG. 31 is a schematic illustration of a method of advantageously employing vehicle chassis structural frames having unitary structural members.

FIG. 31 depicts a method for advantageously employing structural frames having longitudinally-oriented elongated members and transversely-oriented unitary structural members. The method includes providing a first vehicle structural frame having a first configuration 237, including a first length. The first vehicle structural frame has a first selection of at least three generally longitudinally-oriented elongated members. One of the elongated members of the first selection is vertically spaced from the other elongated members of the first selection, and one of the elongated members of the first selection is transversely spaced from the other elongated members of the first selection.

The first vehicle structural frame also has a first set of at least two unitary structural member oriented transversely, spaced a distance apart, and attached to the first selection of at least three longitudinally-oriented elongated members, thereby interconnecting the first selection of elongated members to at least partially form the first structural frame. The method further includes providing a second vehicle structural frame having a second configuration, including a second length 241.

The second structural frame has a second selection of at least three generally longitudinally-oriented elongated members. One of the elongated members of the second selection is vertically spaced from the other elongated members of the second selection, and one of the elongated members of the first selection is transversely spaced from the other elongated members of the first selection. A second set of at least two unitary structural members is oriented transversely, and attached to the second selection of at least three longitudinally-oriented elongated members, thereby interconnecting the second selection of elongated members to at least partially form the second structural frame.

The elongated members of the second selection are sufficiently differently dimensioned from the elongated members of the first selection, or the quantity of elongated members of the first selection differs from the quantity of elongated members in the second selection, such that the second configuration is differently-dimensioned from the first configuration.

The method may further include operably attaching a first steering system, a first energy conversion system, a first braking system, a first load-bearing body-retention coupling with respect to the first structural frame 245, and attaching a second steering system, a second energy conversion system, a second braking system, and a second load-bearing body-retention coupling with respect to the second structural frame 249. The first steering system, the first braking system, the first energy conversion system, the second steering system, the second braking system, and the second energy conversion system are each responsive to non-mechanical control signals. It may be advantageous in some circumstances if the first energy conversion system and the second energy conversion system each include a fuel cell.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

What is claimed is:

1. A vehicle chassis comprising:
    a structural frame having
        at least three longitudinally-oriented elongated members, at least one of said elongated members being vertically spaced from the other elongated members; and
        a unitary structural member extending transversely and vertically between the at least three longitudinally-oriented elongated members, and attached to, and thereby interconnecting, the at least three longitudinally-oriented members; and
    a body attachment interface having body connection components including at least one load-bearing body-retention coupling mounted with respect to the structural frame.

2. The vehicle chassis of claim 1, wherein the unitary structural member includes at least three cavities configured to at least partially locate the at least three longitudinally-oriented elongated members for attachment to the unitary structural member.

3. The vehicle chassis of claim 1, wherein the unitary structural member defines an open space.

4. The vehicle chassis of claim 1, further comprising at least four elongated members, and wherein the unitary structural member is attached to, and thereby interconnects, the at least four longitudinally-oriented elongated members.

5. The vehicle chassis of claim 4, further comprising:
    a suspension system;
    at least three wheels rotatably mounted with respect to the suspension system;
    a braking system;
    a steering system;
    an energy conversion system; and
    an energy storage system operably connected to the energy conversion system.

6. A vehicle chassis comprising:
    a structural frame having
        at least four longitudinally-oriented elongated members, at least one of said elongated members being vertically spaced from the other elongated members; and
        a unitary structural member extending transversely and vertically between the at least four longitudinally-oriented elongated members, and attached to, and thereby interconnecting, the at least four longitudinally-oriented members;
    a body attachment interface having body connection components including at least one load-bearing body-retention coupling mounted with respect to the structural frame;
    a suspension system;
    at least three wheels rotatably mounted with respect to the suspension system;
    a braking system;
    a steering system;

an energy conversion system; and an energy storage system operably connected to the energy conversion system;

wherein the braking system, steering system, and energy conversion system are each operably connected to at least one wheel and configured to respond to non-mechanical control signals;

wherein the body connection components further include at least one control signal receiver connector mounted with respect to the structural frame and configured to convey control signals in non-mechanical form; and wherein each of the steering system, braking system, and energy conversion system are operably connected to a control signal receiver connector.

7. The vehicle chassis of claim 6, wherein the body connection components are in a predetermined spatial relationship with one another, and sufficiently positioned, arranged, and unobstructed such that when a vehicle body having complementary components in the same predetermined spatial relationship as the body connection components is sufficiently positioned relative to the body attachment interface, each of the body connection components is adjacent to a complementary component.

8. The vehicle chassis of claim 6, wherein the structural frame includes at least eight elongated members, and wherein the unitary structural member is attached to, and thereby interconnects, the at least eight longitudinally-oriented elongated members.

9. A vehicle chassis comprising:

a structural frame having
   four elongated members positioned longitudinally; and
   at least two unitary structural members, each of the at least two unitary structural members having an upper cross-member portion and a lower cross-member portion, the upper and lower cross member portions connected by two vertically-oriented portions spaced a distance apart, the upper-cross member portion, lower cross member portion, and two vertically-oriented portions defining an open space configured to contain vehicle chassis hardware, and each of the at least two unitary structural members formed to have at least four cavities configured to at least partially retain the four elongated members in a rectangular arrangement relative to one another;

a body attachment interface having body connection components including at least one load-bearing body-retention coupling mounted with respect to the structural frame, and at least one control signal receiver connector configured to convey control signals in non-mechanical form;

a suspension system;

at least three wheels rotatably mounted with respect to the suspension system;

a braking system;

a steering system;

an energy conversion system; and an energy storage system operably connected to the energy conversion system;

wherein the braking system, steering system, and energy conversion system are operably connected to at least one wheel, each operably connected to a control signal receiver connector, and each configured to respond to non-mechanical control signals.

* * * * *